(12) United States Patent
Umekida et al.

(10) Patent No.: US 7,832,939 B2
(45) Date of Patent: Nov. 16, 2010

(54) BEARING APPARATUS FOR A WHEEL

(75) Inventors: Mitsuru Umekida, Iwata (JP);
Kazunari Yamamoto, Iwata (JP); Eiji Tajima, Iwata (JP); Hiroyuki Ogura, Iwata (JP); Shigeaki Fukushima, Iwata (JP); Masahiro Ozawa, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 10/234,969

(22) Filed: Sep. 3, 2002

(65) Prior Publication Data

US 2003/0059144 A1   Mar. 27, 2003

(30) Foreign Application Priority Data

| Sep. 4, 2001 | (JP) | ............................. 2001-267450 |
| Dec. 5, 2001 | (JP) | ............................. 2001-371549 |
| Dec. 13, 2001 | (JP) | ............................. 2001-380537 |
| Dec. 20, 2001 | (JP) | ............................. 2001-388002 |
| May 16, 2002 | (JP) | ............................. 2002-140966 |

(51) Int. Cl.
*F16C 19/18* (2006.01)
*B60B 27/00* (2006.01)
*F16D 65/12* (2006.01)

(52) U.S. Cl. .................................. 384/544; 301/105.1

(58) Field of Classification Search ................. 384/542, 384/544, 589; 188/17, 18 A; 301/105.1; 29/894.36, 894.361, 898.04
See application file for complete search history.

(56) References Cited

U.S. PATENT DOCUMENTS

| 5,842,388 | A | 12/1998 | Visser et al. |
| 6,364,426 | B1 * | 4/2002 | Horne et al. ............. 301/105.1 |
| 6,485,109 | B2 * | 11/2002 | Brinker et al. ........... 301/105.1 |
| 6,666,303 | B2 * | 12/2003 | Torii et al. ................ 188/18 A |
| 7,044,563 | B2 * | 5/2006 | Suzuki ..................... 301/105.1 |
| 2001/0016520 | A1 | 8/2001 | Sahashi et al. |
| 2002/0066185 | A1 | 6/2002 | Loustanau et al. |
| 2003/0025385 | A1 * | 2/2003 | Morimoto et al. ........ 301/105.1 |

FOREIGN PATENT DOCUMENTS

| FR | 2 795 021 | 12/2000 |
| JP | 7-164809 | 6/1995 |
| JP | 2001-018605 | 1/2001 |
| WO | WO 00/74883 | 12/2000 |

* cited by examiner

*Primary Examiner*—William C Joyce
(74) *Attorney, Agent, or Firm*—Harness, Dickey & Pierce, P.L.C.

(57) ABSTRACT

A bearing apparatus for a wheel comprising a rolling bearing for rotatably supporting a wheel relative to a body of vehicle having double row rolling elements (20) arranged between an inner member 1 and an outer member (10); a wheel mounting flange (5) for fastening the wheel on a hub wheel (2); and an annular groove (7) formed on the wheel mounting flange (5) and having a predetermined width including hub bolts (6); characterized in that one side of the wheel mounting flange (5) at a region other than the annular groove (7) is formed as a cut-finished surface cut after the press fit of the hub bolts (6).

6 Claims, 23 Drawing Sheets

(a)   (b)

(a)

(b)

Prior Art

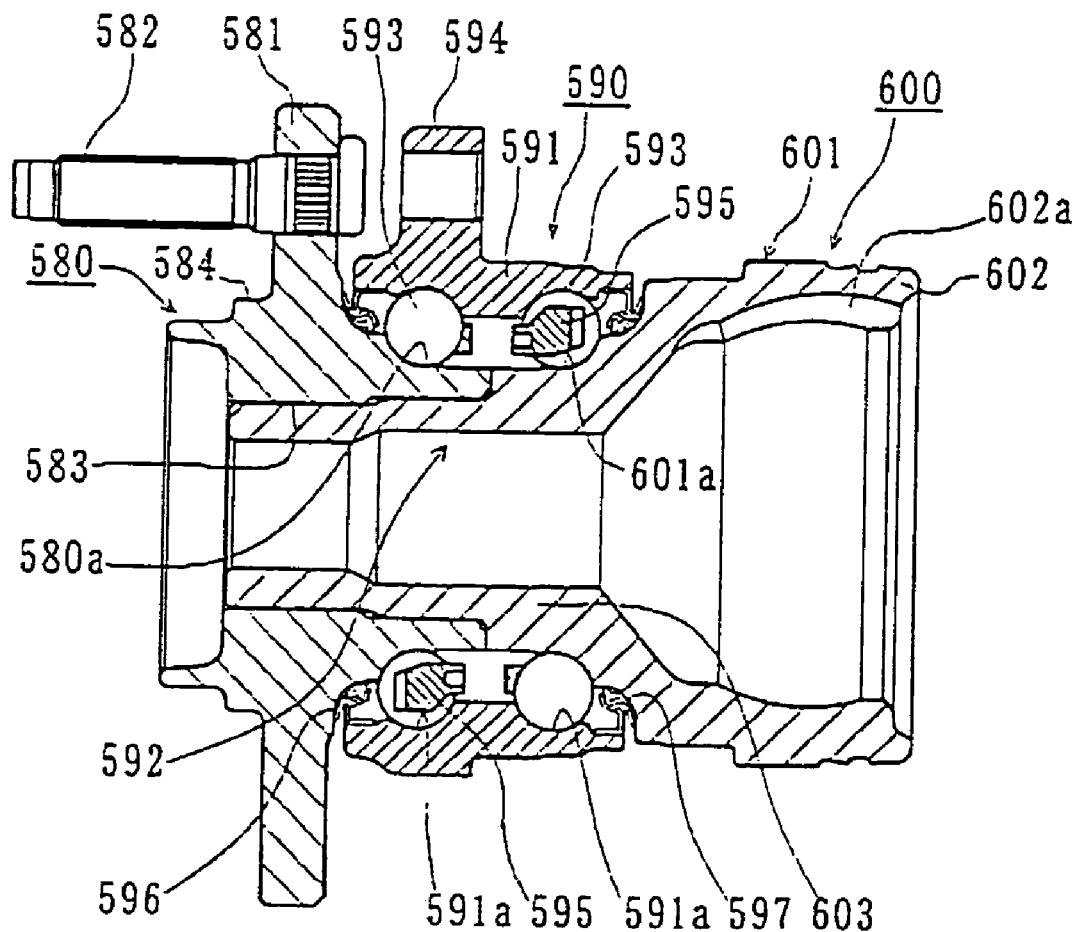
Prior Art

BEARING APPARATUS FOR A WHEEL

CROSS-REFERENCE TO RELATED APPLICATIONS

This application claims priority to Japanese Patent Application Nos. 2001-371549 filed Dec. 5, 2001, 2001-267450 filed Sep. 4, 2001, 2001-380537 filed Dec. 13, 2001, 2001-388002 filed Dec. 20, 2001 and 2002-140966 filed May 16, 2002, which application is herein expressly incorporated by reference.

FIELD OF THE INVENTION

The present invention relates to a bearing apparatus for supporting a wheel of an automobile and the like, and more particularly, to a bearing apparatus for a wheel which has a high surface runout accuracy of a wheel mounting flange and accordingly can suppress a generation of the brake judder.

BACKGROUND OF THE INVENTION

Recently the disc brake has been popularly used. It sometimes causes a vibration and thus an uncomfortable noise of low frequency when a rotor of the disc brake is pinched between brake pads especially in rolling at a low vehicle speed. Such a phenomenon is called in general as "brake judder" and has become a new technological problem to be solved accompanying with the tendencies of high performance and silence of vehicles.

Although the mechanism of the brake judder has not been made clear yet, it is supposed that one of its causes is the surface runout of the pad contact surface of the brake rotor. The surface runout of the brake rotor is caused not only by the surface runout of the brake rotor itself but also the surface runout of the wheel mounting flange for mounting the brake rotor, the axial runout of the rolling bearing, the accuracy of the raceway surfaces of the rolling bearing, the assembly accuracy of the rolling bearing.

Recently the bearing apparatus for a wheel is required to be slimmed in order to reduce the manufacturing cost and to improve the fuel consumption and on the contrary, also required to have a high rigidity in order to improve the stability in steering. Accordingly it is necessary to improve the accuracy of the surface runout with satisfying such an antinomic demands.

FIG. 28 shows a bearing apparatus for a wheel of the prior art in which FIG. 28(a) is a side elevational view thereof and FIG. 28(b) is a longitudinal cross-section view thereof. In the description of the present specification, a term "outboard side" means an outside of a vehicle (left-hand in drawings) and a term "inboard side" means a central side of a vehicle (right-hand in drawings).

The bearing apparatus for a wheel has an inner member 550, an outer member 560, and double row rolling elements 570 and 570. The inner member 550 comprises a hub wheel 551 and an inner wheel 552 separate from the hub wheel 551 and adapted to be press fitted onto a stepped portion 553 of a smaller diameter formed at the inboard end of the hub wheel 551. An inner raceway surface 551a of outboard side is formed on the peripheral surface of the hub wheel 551 and an inner raceway surface 552a of inboard side is formed on the periphery of the inner wheel 552. The hub wheel 551 is integrally formed, at its outboard end, with a wheel mounting flange 554 for mounting a wheel (not shown) in which several bolt apertures 557 for studding hub bolts 555 for securing the wheel are formed equidistant in a circumferential direction.

The outer member 560 has a flange 561 to be mounted on a vehicle body (not shown) as well as double row outer raceway surfaces 560a and 560b formed on the inner peripheral surface. A plurality of double row rolling elements (balls) are retained freely rotatable between these outer raceway surfaces 560a and 560b and the inner raceway surfaces 551a and 552a by cages 572 and 571.

Seals 562 and 563 are arranged at opposite ends of the outer member 560 for sealing an annular space between the outer member 560 and the inner member 550 to prevent leakage of grease within the bearing as well as to prevent ingress of rainwater or dusts.

Formed on a side 554a of the wheel mounting flange 554 is an annular groove 556 in which bolt apertures 557 for stud bolts 555 are formed. The hub bolts 555 each having a knurl 555a are press fitted in the apertures 557. The brake rotor (not shown) is secured on the wheel mounting flange 554 by nuts (not shown) screwed on the bolts 555 and a wheel is further secured on the wheel mounting flange 554 via the brake rotor (not shown).

In another bearing apparatus for a wheel of the prior art shown in FIG. 29, it comprises a hub wheel 580, a bearing portion 590, and a constant velocity universal joint 600 which are assembled as a unit. The hub wheel has a wheel mounting flange 581 for mounting a wheel (not shown) integrally formed therewith in which several hub bolts 582 for securing the wheel are studded equidistant in a circumferential direction.

The bearing portion 590 comprises an outer member 591, an inner member 592, and double row rolling elements 593 and 593. The outer member 591 has a flange 594 to be mounted on a vehicle body (not shown) integrally formed therewith and double row outer raceway surfaces 591a and 591a formed in the inner circumferential surface. On the contrary the inner member 592 has double row inner raceway surfaces 580a and 601a arranged opposed to the outer raceway surfaces 591a and 591a. In these inner raceway surfaces 580a and 601a, the inner raceway surface 580a of the outboard side is formed on the outer peripheral surface of the hub wheel 580 and the inner raceway surface 601a of the inboard side is formed on the outer peripheral surface of an outer joint member 601. A plurality of double row rolling elements 593 and 593 are retained freely rotatable between these outer raceway surfaces 591a and 591a and the inner raceway surfaces 580a and 601a by cages 595 and 595. In this case the inner member comprises the hub wheel 580 and the outer joint member 601. Seals 596 and 597 are arranged at opposite ends of the bearing portion 590 to prevent leakage of grease within the bearing as well as to prevent ingress of rainwater or dusts.

The constant velocity universal joint 600 comprises the outer joint member 601, an inner wheel (not shown) of the joint member, a cage, and torque transmitting balls. The outer joint member 601 comprises a cup-shaped mouth portion 602, and a shaft portion 603 axially extending from the mouth portion 602. An axially extending curved track groove 602a is formed on the inner circumferential surface of the mouth portion 602.

The hub wheel 580 and the outer joint member 601 are integrated each other via the plastic deformation of the shaft portion 603 into the irregular surface portion 583 of the hub wheel 580 by expanding the diameter of the shaft member 603 and then by caulking the interfitted portion (see Japanese Laid-open Patent Publication No. 18605/2001).

It is possible for these bearing apparatus for a wheel to improve the loose and the abrasion in the interfitted portion as compared with torque transmitting means using the serration and the like of the prior art and also possible to achieve further compacted and light-weighed bearing apparatus since the interfitted portion has functions of torque transmission and connection between the hub wheel and the outer joint member.

However, in the bearing apparatus for a wheel of the prior art shown in FIG. 28, it is difficult to eliminate the deformation of the side 554a of the wheel mounting flange 554 caused by the studding of the hub bolts 555 since the studding of the hub bolts 555 is carried out after the formation of the annular groove 556 in the side 554a of the wheel mounting flange. Especially when using steel wheels, since the accuracy of the mounting surface of them is inferior to that of the aluminum alloy wheels formed by cutting, the surface runout accuracy of the side (i.e. the pad contact surface) of the brake rotor would be rather worsened depending on the depth and the width of the annular groove 556.

Accordingly, it is difficult to perfectly prevent the influence of the studding of the hub bolts 555 to the side 554a of the wheel mounting flange 554 only by the formation of the annular groove 556 in the side 554a of the wheel mounting flange 554 and of the bolt apertures 557 within the annular groove 556.

Also in the bearing apparatus for a wheel of the prior art shown in FIG. 29, it has been found not only that the caulking of the shaft portion 603 enlarges the pilot portion 584 of the wheel mounting flange 581 for guiding the brake rotor (not shown), which makes the mount of the brake rotor difficult, but also that the elongation of the shaft portion 603 toward the outboard side causes the inclination of the wheel mounting flange 581 toward the inboard side. The amount of deformation caused by them varies depending on the caulking conditions etc. and thus it is difficult to previously set the amount of deformation, which worsens the surface runout accuracy of the wheel mounting flange 581.

SUMMARY OF THE INVENTION

It is, therefore, an object of the present invention to provide a bearing apparatus for a wheel which can improves the accuracy of the surface runout of the brake rotor as well as can make the bearing apparatus compact and reduce its own weight by uniting the bearing apparatus.

For achieving the object, according to the present invention, a bearing apparatus is provided for a wheel comprising a rolling bearing for rotatably supporting a wheel relative to a body of vehicle having double row rolling elements arranged between an inner member and an outer member; a wheel mounting flange formed on either the inner member or the outer member for fastening thereon the wheel via a brake rotor; and a plurality of hub bolts studded on the wheel mounting flange circumferentially along the periphery thereof, characterized in that one side of the wheel mounting flange is formed as a cut-finished surface cut after the press fit of the bolts.

Since one side of the wheel mounting flange to which the brake rotor is mounted is formed as a cut-finished surface cut after the press fit of the bolts, it is possible to suppress the influence of the studding of the hub bolts to the accuracy of surface runout of the side of the wheel mounting flange substantially zero.

According to the present invention, a bearing apparatus is provided for a wheel comprising a hub wheel formed with a wheel mounting flange for fastening thereon the wheel via a brake rotor and for studding a plurality of hub bolts thereon circumferentially along the periphery thereof, a constant velocity universal joint, and a double row rolling bearing for rotatably supporting the wheel relative to a body of vehicle; the hub wheel and an outer joint member of the constant velocity universal joint being interfitted each other; and the rotation of the constant velocity universal joint being adapted to be transmitted to the hub wheel, characterized in that the inner surface of the hub wheel is formed as a hardened irregular surface portion; in that the hub wheel and the outer joint member are integrated each other via the plastic deformation of the outer surface of the outer joint member into the irregular surface portion of the hub wheel by expanding the diameter of the outer joint member; and in that one side of the wheel mounting flange is formed as a cut-finished surface cut after the press fit of the hub bolts and said integration via the plastic deformation.

Since the hub wheel and the outer joint member are integrated each other via the plastic deformation of the outer surface of the outer joint member into the irregular surface portion of the hub wheel and one side of the wheel mounting flange is formed as a cut-finished surface cut after the press fit of the hub bolts, it is possible to improve the loose and the abrasion in the interfitted portion as compared with torque transmitting means using the serration and the like of the prior art and also possible to achieve further compacted and light-weighed bearing apparatus and simultaneously possible to suppress the influence of the studding of the hub bolts to the accuracy of surface runout of the side of the wheel mounting flange substantially zero.

According to the present invention, since the pilot portion of the hub wheel for guiding the brake rotor formed as a cut-finished surface cut after said integration via the plastic deformation, the deformation of the pilot portion can be corrected by cutting operation and thus the brake rotor can be easily mounted on the hub wheel although the pilot portion would be deformed by the integration via the plastic deformation.

According to the present invention, since the wheel mounting flange is formed with an annular groove having a predetermined width including apertures for the hub bolts, and wherein one side of the wheel mounting flange except for the region of the annular groove is formed as a cut-finished surface cut after the press fit of the hub bolts, it is possible to achieve the finished surface by the simple lathe turning and thus to reduce the manufacturing cost due to the reduction of the steps of machining.

According to the present invention, since the dimension of the annular groove, when the wheel is that made of steel, is so determined that the outer diameter of the annular groove is smaller than the diameter of the contacting portion between the wheel and the brake rotor positioned radially outward of the bolt apertures as well as the inner diameter of the annular groove is larger than the diameter of the contacting portion between the wheel and the brake rotor positioned radially inward of the bolt apertures, it is possible to suppress the surface runout of the side of the brake rotor below the predetermined value although when using the press-formed steel wheel having a bad accuracy of the mount portion.

It is preferable that the hub bolts are studded within the annular groove and wherein the distance between the external surface of each hub bolt and the edges of the annular groove is set larger than 1 mm. Such a structure allows the deformation of the region of the annular groove around the hub bolt and improves the operability of finishing operation of the side of the flange.

It is more preferable that the depth of the annular groove is set at least larger than 0.3 mm. This permits generation of the dispersion of machining of the annular groove and the dispersion of cutting of the flange after the studding of the hub bolts.

According to the present invention, since the region of the wheel mounting flange radially outward of the bolt apertures is inclined or projected toward the wheel side, it is possible to obtain an intimate contact between the brake rotor and the peripheral portion of the wheel mounting flange and to restrain the freedom of deformation of the brake rotor to suppress the surface runout thereof.

It is preferable that the surface runout at a side of the wheel mounting flange on which the brake rotor contacts is limited lesser 20 μm. In such a construction, it is possible to suppress the surface runout of the side of the brake rotor below the predetermined value.

According to the present invention, a bearing apparatus is provided for a wheel comprising a hub wheel, a constant velocity universal joint, and a double row rolling bearing; the hub wheel and an outer joint member of the constant velocity universal joint being interfitted each other; the inner surface of the hub wheel being formed as a hardened irregular surface portion; the hub wheel and the outer joint member being integrated each other via the plastic deformation of the outer surface of the outer joint member into the irregular surface of the hub wheel by expanding the interfit portion of the outer joint member, characterized in that an amount of the expansion of the interfit portion of the outer joint member at the outboard side is small than an amount of that of the inboard side.

Since the hub wheel and the outer joint member are integrated each other via the plastic deformation, it is possible to achieve a compacted and light-weighed bearing apparatus and simultaneously possible to suppress the influence of the studding of the hub bolts to the accuracy of surface runout of the side of the wheel mounting flange substantially zero and accordingly to further improve the durability and the steering stability.

It is preferable that the inner diameter of the interfit portion of the outer joint member is formed so that it gradually decreases from the outboard side to the inboard side. In this case, although excessive torque is applied to the interfitted portion it is firstly received in the interfitted portion at its inboard side. Accordingly it is possible to maintain a sufficient strength of connection if the amount of expansion at the outboard side is relatively reduced.

According to the present invention, the inner surface of the interfit portion of the outer joint member is formed at the outboard side thereof with a stepped portion of a larger diameter. When the stepped portion of a larger diameter is formed in the inner surface of the interfit portion of the outer joint member at the outboard side, it is possible to suppress the influence of the studding of the hub bolts to the accuracy of surface runout of the side of the wheel mounting flange.

As defined in the invention, in addition to the inner diameter of the interfit portion of the outer joint member, it is possible the outer diameter of the interfit portion of the outer joint member is formed so that it gradually increases from the outboard side to the inboard side.

Further, it is possible to form a stepped portion of a smaller diameter at the outboard side of the interfit portion of the outer joint member.

According to the invention, the hardened irregular surface portion formed the inner surface of the hub wheel is formed by cross-grooves of axial grooves and circumferential grooves substantially orthogonally crossing each other, and wherein the width of the circumferential grooves is gradually increased from the inboard side to the outboard side. In such a case, the amount of bite into the irregular surface portion is varied and thus it is possible to suppress the expansion of the pilot portion due to the interfit via plastic deformation minimum.

According to the present invention, the hardened irregular surface portion formed the inner surface of the hub wheel is formed by cross-grooves of axial grooves and circumferential grooves substantially orthogonally crossing each other, and wherein the width of the circumferential grooves in a region corresponding to the width of the wheel mounting flange is smaller than the width of the circumferential grooves in the other region. In this case, it is possible to suppress a deterioration of the accuracy of surface runout and to improve the torque transmission ability at the connected portion via the plastic deformation by increasing the density of the circumferential groove only in the region corresponding to the width of the wheel mounting flange.

The bearing assembly has a structure so called a fourth generation. In such a structure, it is possible to reduce the number of parts at the interfit portion minimum and thus to achieve further compacted and light-weighed bearing apparatus and to improve the durability and the steering stability thereof.

According to the present invention, a bearing apparatus is provided for a wheel comprising an inner member, a double row rolling bearing, and a constant velocity universal joint; at least one of the inner raceway surfaces of the double row rolling bearing being arranged on an inner wheel separate from a hub wheel; said inner member including the hub wheel having on its one end a wheel mounting flange and an annular member to be inserted in the hub wheel and having said inner wheel and external teeth; the annular member being connected to the hub wheel so that the annular member cannot be rotated relative to the hub wheel as well as cannot be axially separated from the hub wheel; internal teeth formed on an outer joint member of the constant velocity universal joint being mated with the external teeth; and an axially separable connecting means being arranged between the annular member and the outer joint member, characterized in that the inner surface of the hub wheel is formed as a hardened irregular surface portion at an interfit portion of the hub wheel and the annular member; in that an amount of the expansion of the interfit portion of annular member at the outboard side is small than an amount of that of the inboard side; and in that the hub wheel and the annular member are integrated each other via the plastic deformation of the annular member into the irregular surface portion of the hub wheel by expanding the diameter of the annular member.

It is possible to separate the inner member from the constant velocity universal joint with a simple operation at a time of inspection since the hub wheel and the bearing portion previously made as a compact sub-unit can be united to the constant velocity universal joint by a "one-touch" operation. In addition, it is very convenient that only a part get out of order can be exchanged not as a unit.

According to the invention, it is possible to reduce the number of parts, to improve the assembling operation and also to achieve the bearing apparatus of low cost, light weight and compact.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 29 is a longitudinal cross-section view of a bearing apparatus for a wheel of the prior art.

DETAILED DESCRIPTION OF THE PREFERRED EMBODIMENTS

The following description of the preferred embodiment(s) is merely exemplary in nature and is in no way intended to limit the invention, its application, or uses.

Figure 1:
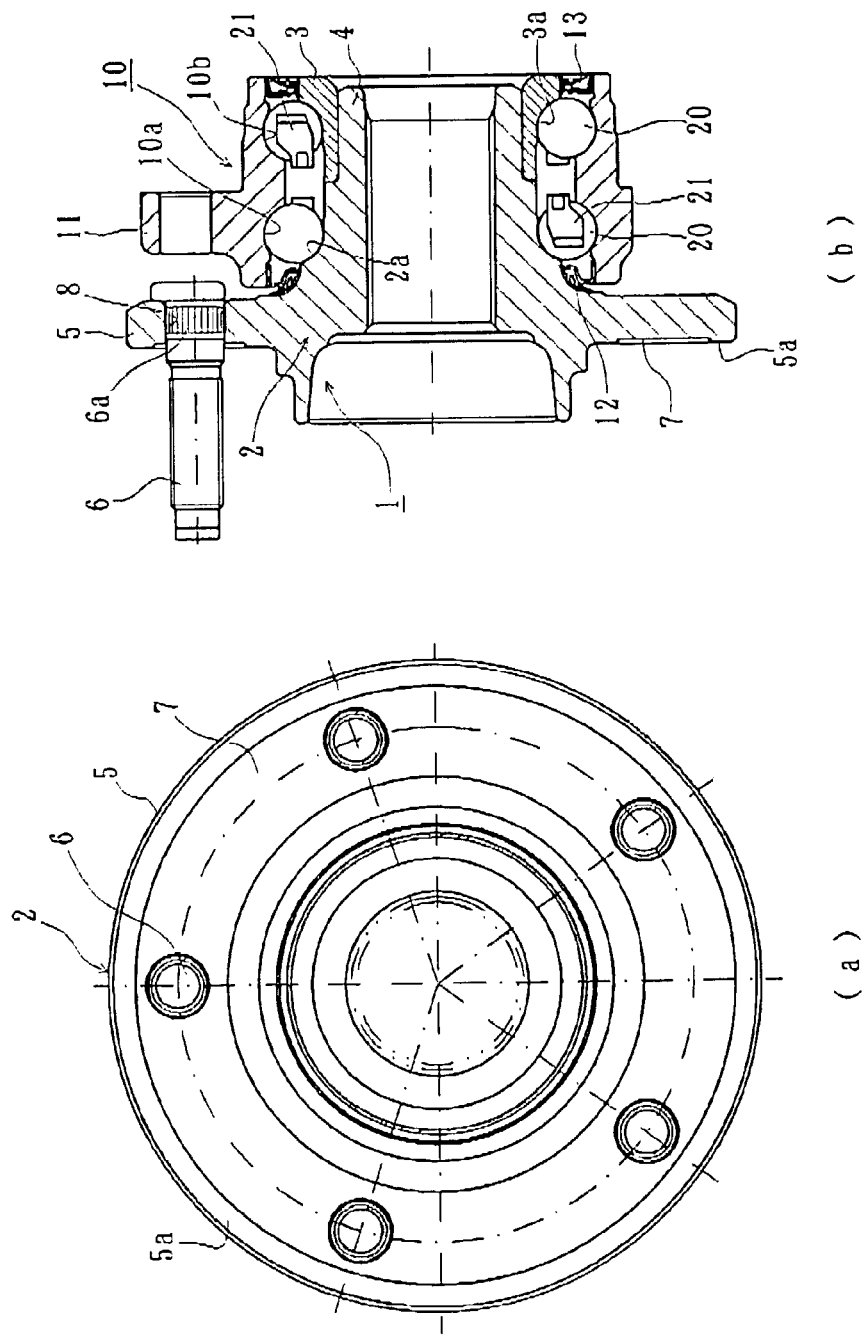
FIG. 1(a) is a side elevational view of the bearing apparatus for a wheel of a first embodiment of the present invention and FIG. 1(b) is a longitudinal cross-section view thereof.

FIG. 1(a) is a side elevational view of the bearing apparatus for a wheel of a first embodiment of the present invention and FIG. 1(b) is a longitudinal cross-section view thereof.

The bearing apparatus for a wheel of this embodiment comprises an inner member 1, an outer member 10, and double row rolling elements 20 and 20. The inner member 1 comprises a hub wheel 2 and an inner wheel 3 separate from the hub wheel 2, and the inner wheel 3 is press fitted on a stepped portion 4 of a smaller diameter formed at an end of the inboard side. An inner raceway surface 2a of the outboard side is formed on the outer circumferential surface of the hub wheel 2, on the contrary, an inner raceway surface 3a of the inboard side is formed on the outer circumferential surface of the inner wheel 3. The hub wheel 2 is integrally formed with a wheel mounting flange 5 for mounting a wheel (not shown) of a vehicle and hub bolts 6 are studded in bolt apertures 8 arranged equidistantly along a circumferential direction of the wheel mounting flange 5.

A flange 11 to be mounted on a vehicle body (not shown) is arranged around the outer member 10 and double row outer raceway surfaces 10a and 10b are formed on the inner circumferential surface thereof. Double row rolling elements (balls) 20 and 20 are retained between the inner raceway surfaces 2a and 3a and outer raceway surfaces 10a and 10b.

Seals 12 and 13 are arranged at opposite ends of the outer member 10 for sealing an annular space between the outer member 10 and the inner member 1 to prevent leakage of grease within the bearing as well as to prevent ingress of rainwater or dusts.

One side 5a of the wheel mounting flange 5 on which a brake rotor is arranged is initially cut by e.g. a lathe and is formed with an annular groove 7. The bolt apertures 8 are arranged at the center of the width of the annular groove 7 equidistantly along a circumferential direction. A secondary cutting of the side 5a is carried out by e.g. a lathe after the hub bolts each having a knurl portion 6a have been press fitted or studded into the bolt apertures 8. The secondary cutting may be carried out by a milling machine or a grinding machine. It is not necessary to arrange the bolt apertures 8 at the center of the width of the annular groove 7.

Figure 2:
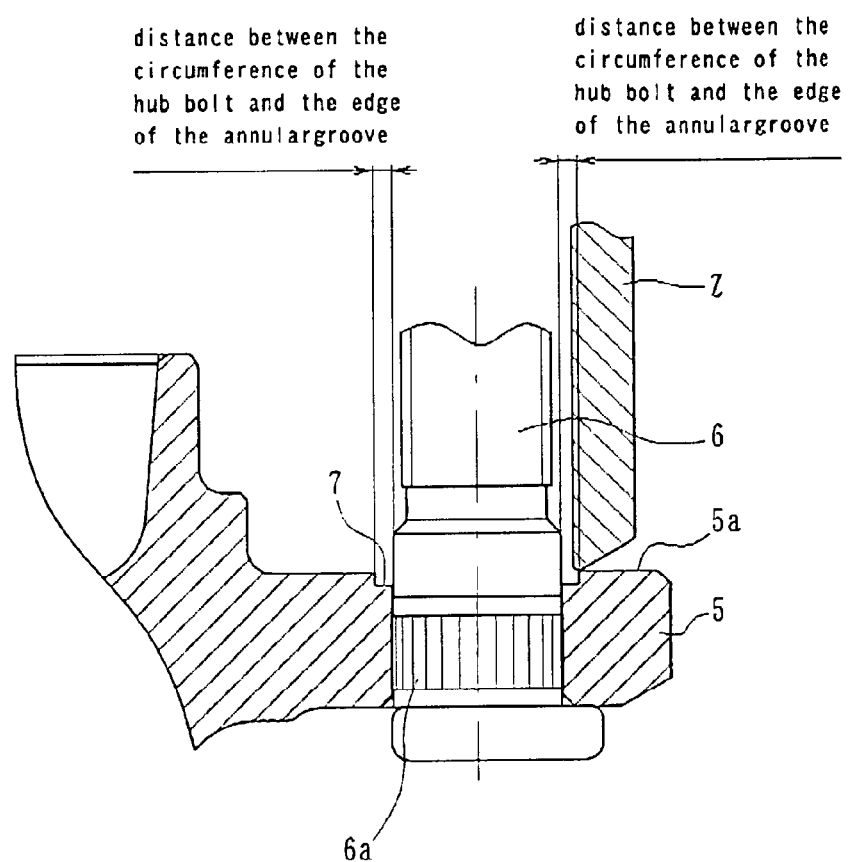
FIG. 2 is a partially enlarged cross-section view of the apparatus of FIG. 1.

FIG. 2 is an enlarged cross-section view of the annular groove 7 formed on the side 5a of the flange 5. If making the width of the annular groove 7 large, operability of the secondary cutting of the side 5a after the studding of the hub bolts 6 can be improved. However the enlargement of the width of the annular groove 7 reduces the contact area between the mount surface of the brake rotor and the side 5a and thus increases the deformation of the flange 5 after tightening of nuts onto the hub bolts 6. When setting the distance of 1 mm between the circumference of the hub bolt 6 and the edge of the annular groove 7, the contact area between the brake rotor and the side 5a will not be so much reduced and therefore it is possible to suppress the deformation of the wheel mounting flange 5 when a wheel is tighten onto the hub bolts 6 by nuts and thus to suppress the surface runout of the side 5a minimum. If setting said distance more than 1 mm, a cutting tool "Z" such as a cutting bite will not interfere with the hub bolts 6.

The provision of the annular groove 7 on the side 5a can suppress the influence of the studding of the hub bolts 6 to the side 5a minimum. In addition, the secondary cutting of the side 5a after the press fitting (studding) of the hub bolts 6 can reduce the surface runout of the side 5a generated by the inter fit of the hub bolts 6 to almost zero.

Although when the annular groove 7 is not formed on the side 5a, it is possible to reduce the surface runout to almost zero by carrying out the secondary cutting of the side 5a.

Figure 3:
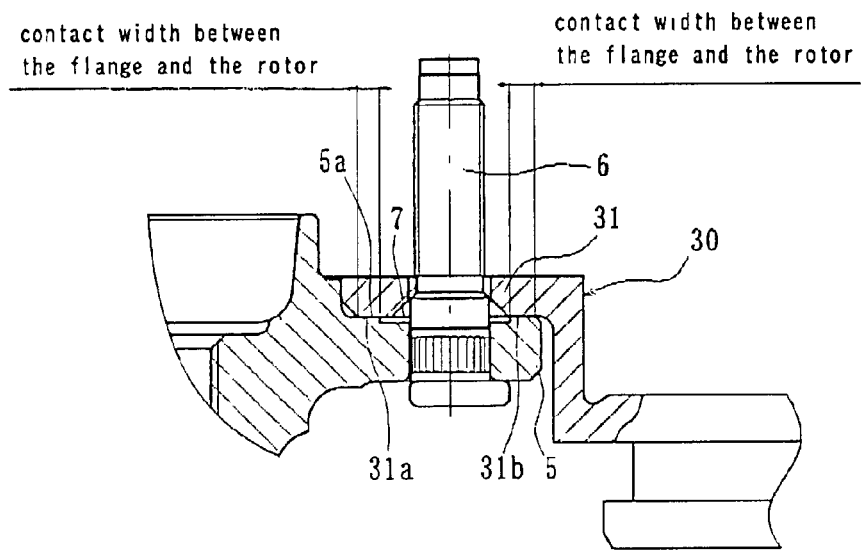
FIG. 3 is a partially enlarged cross-section view of the apparatus of FIG. 1.

FIG. 3 is an enlarged cross-section view showing a condition in which the brake rotor 30 is mounted on the wheel mounting flange 5. It is found that provision of contact surfaces 31a and 31b between the mounting portions 31 of the rotor 30 and flange 5 at either sides of the hub bolts 6 can suppress the deformation of the flange 5 due to the fastening of the nuts minimum.

Figure 4:
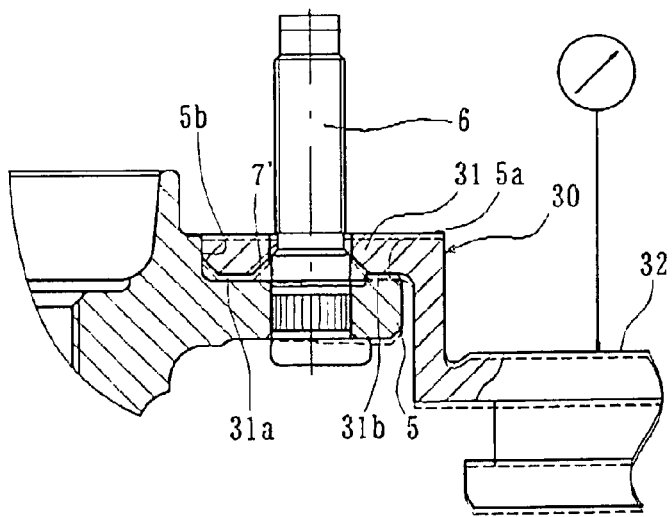
FIG. 4 is an explanatory view showing a portion corresponding to the portion of FIG. 3 for comparing therewith.
Figure 5:
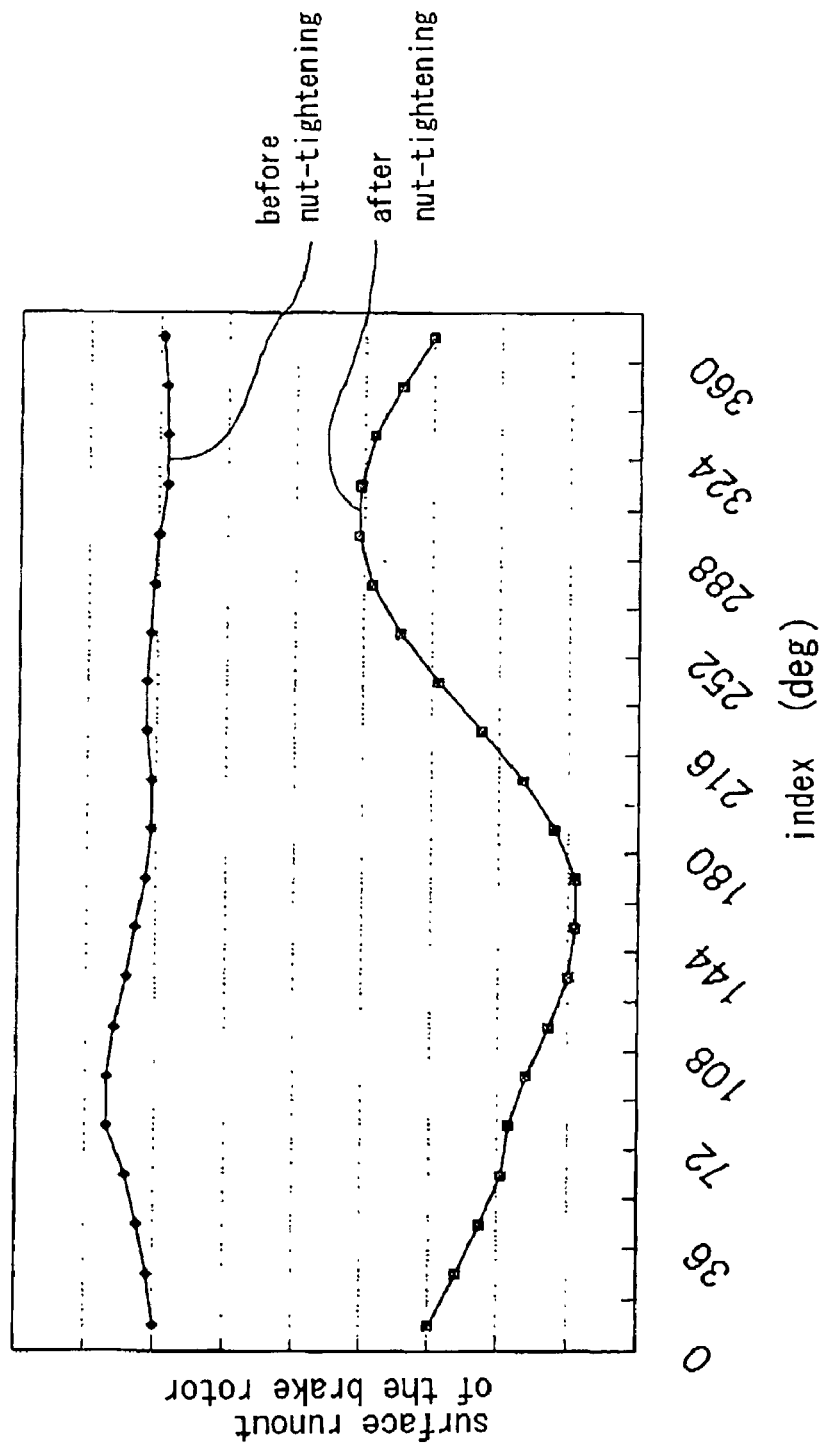
FIG. 5 is an explanatory graph for comparing with the bearing apparatus of the present invention.

FIG. 4 is an enlarged cross-section view showing a condition in which the brake rotor 30 is mounted on the wheel mounting flange 5 and there is shown an annular groove 7' extended to a pilot portion 5b. In this case, the mounting portion 31 of the brake rotor 30 can contact with the flange 5 only at the region 31b and not contact with the flange at region 31a inside the hub bolts 6. Under the circumstances, the surface runout of a side 32 of the brake rotor 30 after the tightening of the hub bolts 6 is increased due to the inclination of the flange 5 as shown in FIG. 5.

It is also found that the surface runout of the brake rotor 30 can be suppressed by inclining or projecting the region of the wheel mounting flange radially outward of the bolt apertures toward the wheel side. This is because that the mounting portion 31 of the brake rotor 30 can intimately contacts with the side 5a of the wheel mounting flange 5 at a radially outward region and thus the freedom of the deformation is restrained. It is preferable that the amount of the projection should be less than 0.1 mm (at most inclination angle 10'). If the projection exceeds this value, the wheel mounting flange 5 itself would be inclined and the surface runout of the side 32 of brake rotor 30 would be worsened.

Figure 6:
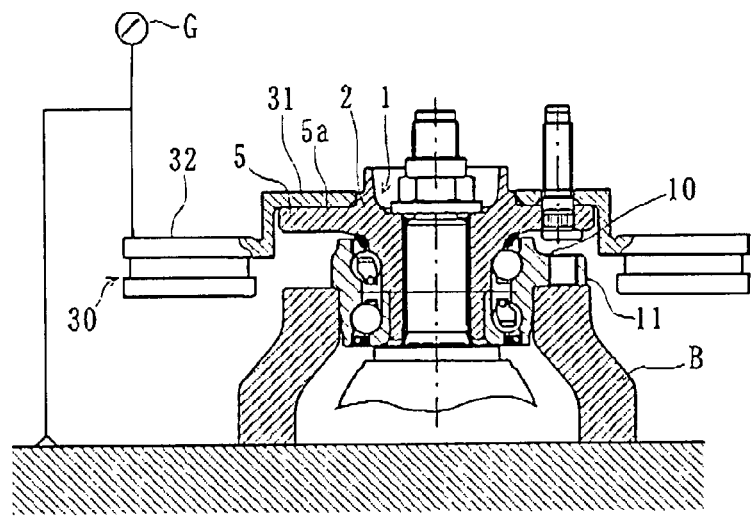
FIG. 6 is a longitudinal cross-section view showing a method for measuring the surface runout of the bearing apparatus of the present invention.
Figure 7:
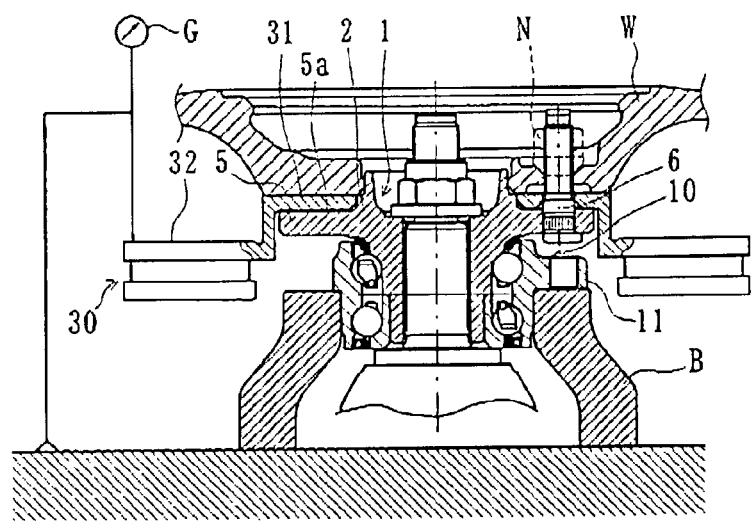
FIG. 7 is a longitudinal cross-section view similar to FIG. 6.

A method for measuring the surface runout will be hereinafter described. FIG. 6 shows a condition of the brake rotor 30 on the wheel mounting flange 5 before the nuts have not be tightened yet, and FIG. 7 shows a similar condition after the nuts are tightened.

As shown in FIG. 6, the flange 11 mounted on the vehicle body of the outer member 10 is placed on a base "B" to hold the inner member 1 freely rotatable and the stylus of a dial gauge "G" is contacted with the side 32 of the brake rotor 30 with the mounting portion 31 of the brake rotor 30 being intimately contacted with the side 5a of the wheel mounting flange 5. The surface runout of the side 32 of the brake rotor 30 can be measured by rotating the inner member 1.

After tightening the nuts "N" on the hub bolts 6 with the wheel "W" being intimately contacted with the mounting portion 31 of the brake rotor 30, the surface runout of the side 32 of the brake rotor 30 can be measured similarly by rotating the inner member 1 with the stylus of the dial gauge "G" being contacted with the side 32 of the brake rotor 30. The applicants have verified the influences and results of the surface runout of the side 32 of the brake rotor 30 before and after the tightening of the nuts "N".

Figure 8:
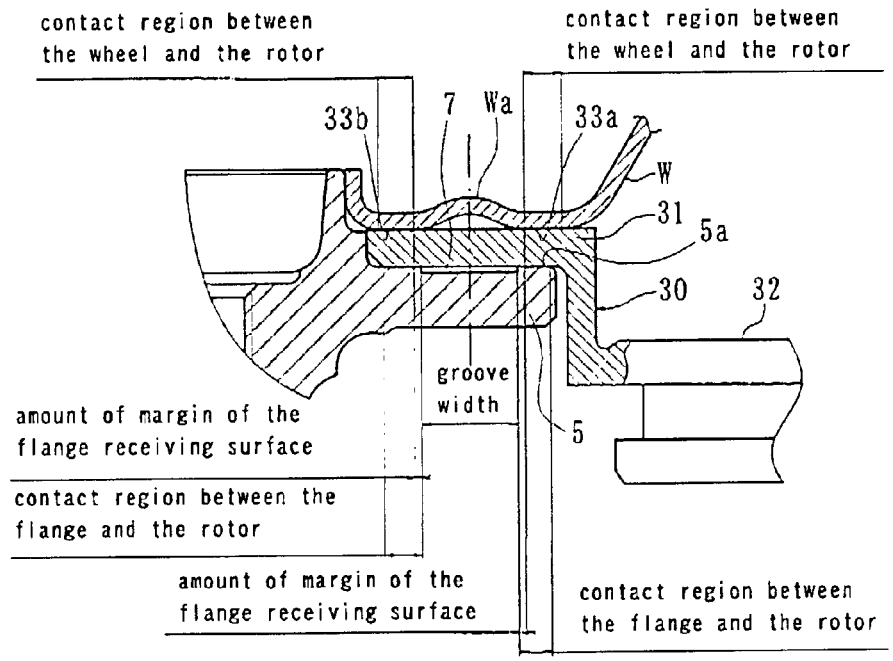
FIG. 8 is an enlarged cross-section view showing a essential portion of the bearing apparatus of the present invention.

FIG. 8 is an partially enlarged cross-section view showing a condition in which the brake rotor 30 and the wheel "W" are mounted on the wheel mounting flange 5 and nuts (not shown) are tightened. The wheel "W" is a press formed steel wheel and generally has recesses "Wa" on the pitch circle of the hub bolts (not shown) to increase the rigidity of the wheel. The wheel "W" and the brake rotor 30 contact with each other via a partial contact not a full face contact due to the presence of the recesses "Wa". In general wheels made of aluminum alloy and the like have their contact portions contacting with the brake rotor finished by cutting and thus have high accuracy of finished surface of the mounting portion. On the contrary the steel wheels "W" have low accuracy of the surface of the mounting portion and thus increase the surface runout of the side of the brake rotor.

It is found that the surface runout of the side 32 of the brake rotor 30 can be suppressed although using the steel wheels "W" by setting so that the dimension of the width of the annular groove 7 is so determined that the outer diameter of the annular groove is smaller than the diameter of the contacting portions 33a between the wheel "W" and the brake rotor 30 positioned radially outward of the pitch circle diameter of the hub bolts as well as the inner diameter of the annular groove is larger than the diameter of the contacting portions 33b between the wheel "W" and the brake rotor 30 positioned radially inward of the pitch circle diameter of the hub bolts, that is, so that the annular groove 7 is positioned between the contacting portions 33a and 33b.

Figure 9:
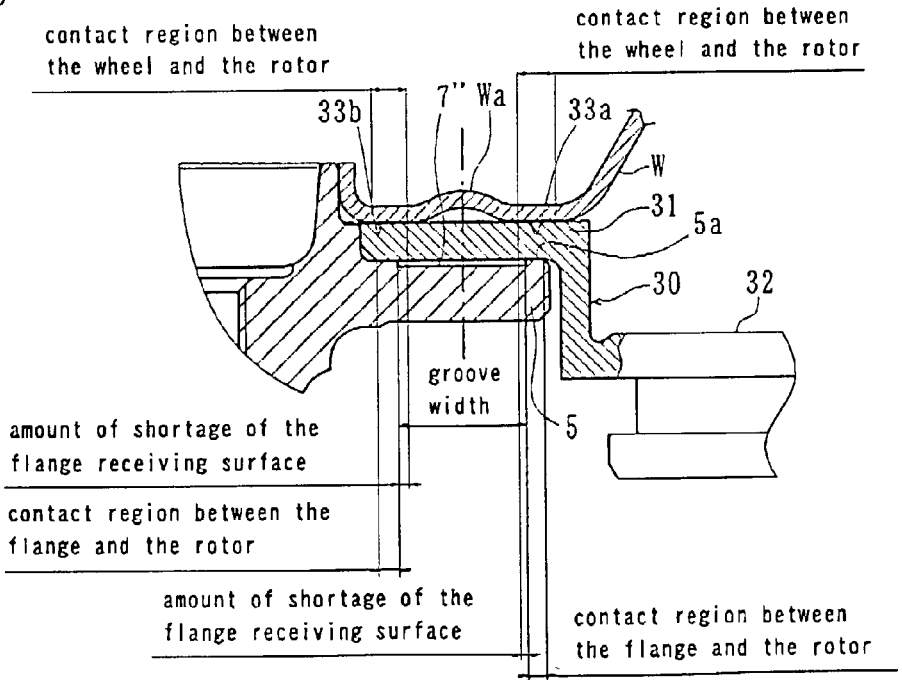
FIG. 9 is an explanatory view showing a portion corresponding to the portion of FIG. 8 for comparing therewith.
Figure 11:
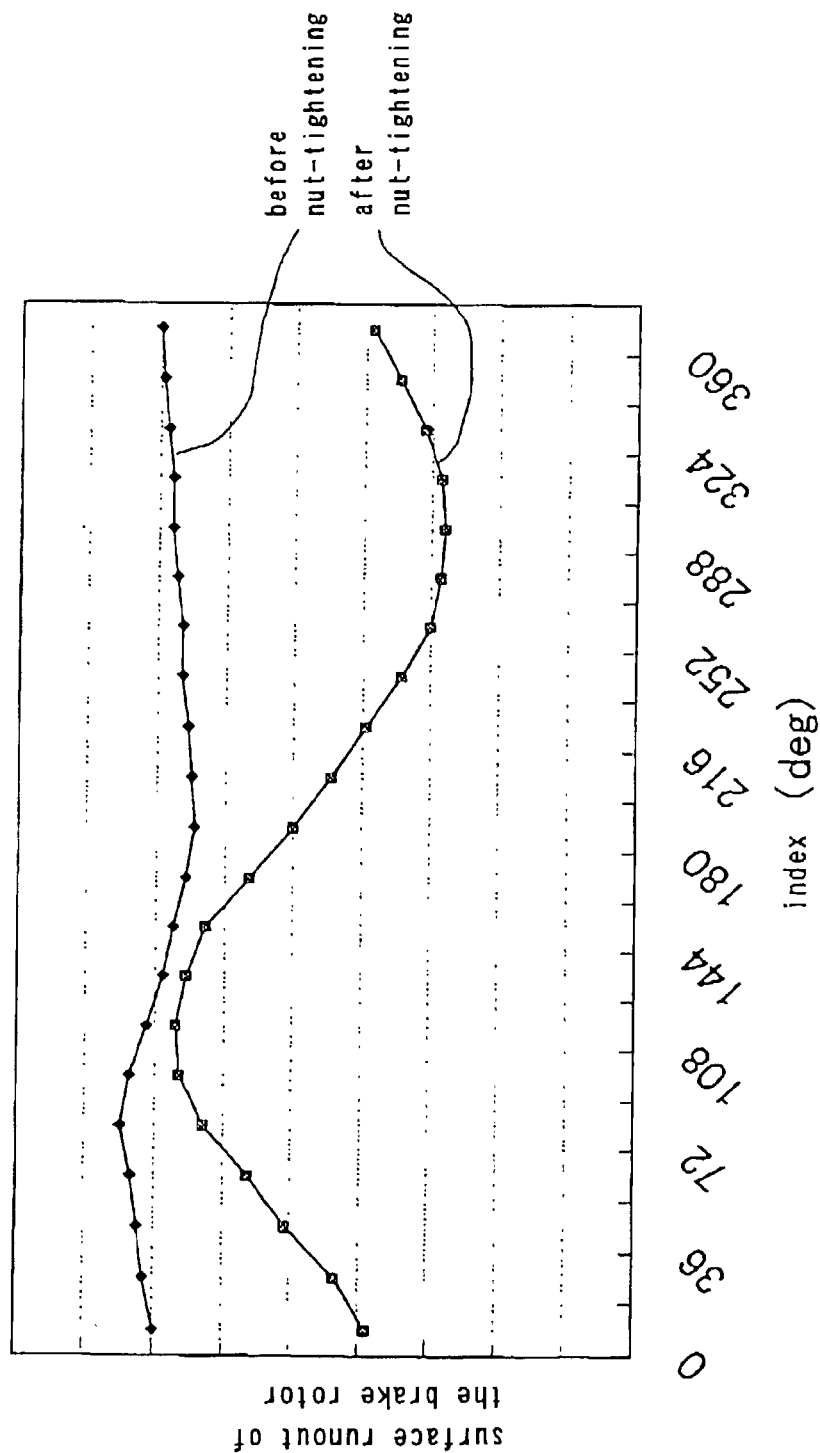
FIG. 11 is an explanatory graph for comparing with the graph of FIG. 10.
Figure 12:
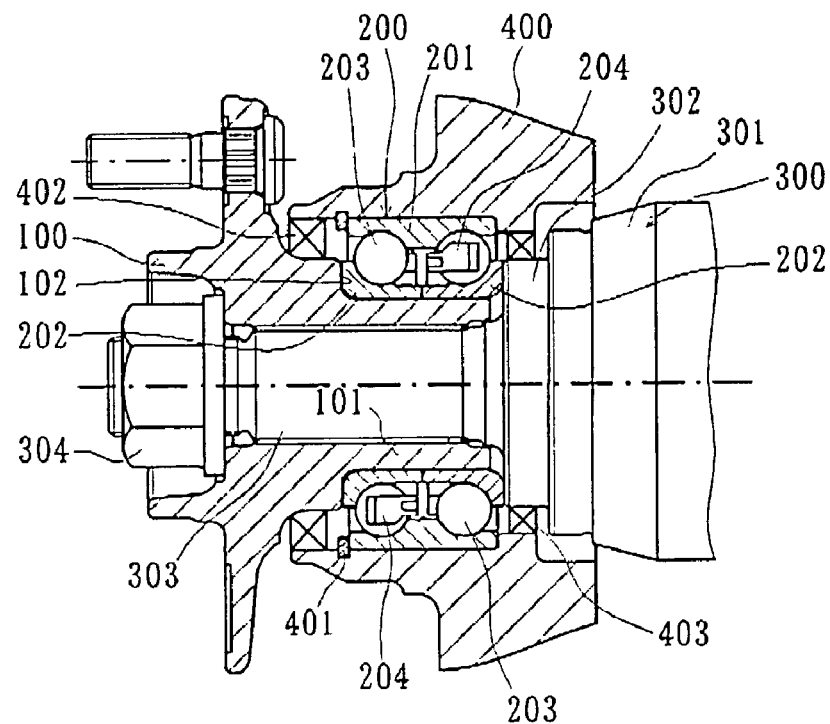
FIG. 12 is a longitudinal cross-section view of the bearing apparatus for a wheel of a second embodiment of the present invention.

However it is also found that when the annular groove 7" is widened until the edges of the annular groove 7" reach the contacting portions 33a and 33b as shown in FIG. 9, the contact area of the side 5a will be shortened and the wheel mounting flange 5 is deformed when the nuts are tightened and thus the surface runout of the side 32 of the brake rotor 30 is worsened. FIGS. 11 and 12 are graphs showing the verified results of influences of the differences of the width of the annular groove to the surface runout of the side 32 of the brake rotor 30 in which FIG. 10 shows the surface runout of the side 32 of the brake rotor 30 respectively of before and after the tightening of nuts in a case that the width dimension of the annular groove 7 is set so that the annular groove 7 is positioned between the contacting portions 33a and 33b as explained with respect to FIG. 8, and FIG. 11 shows the surface runout of the side 32 of the brake rotor 30 respectively of before and after the tightening of nuts in a case that the width dimension of the annular groove 7" is widened so that the edges of the annular groove 7" reach the contacting portions 33a and 33b as explained with respect to FIG. 9.

Figure 10:
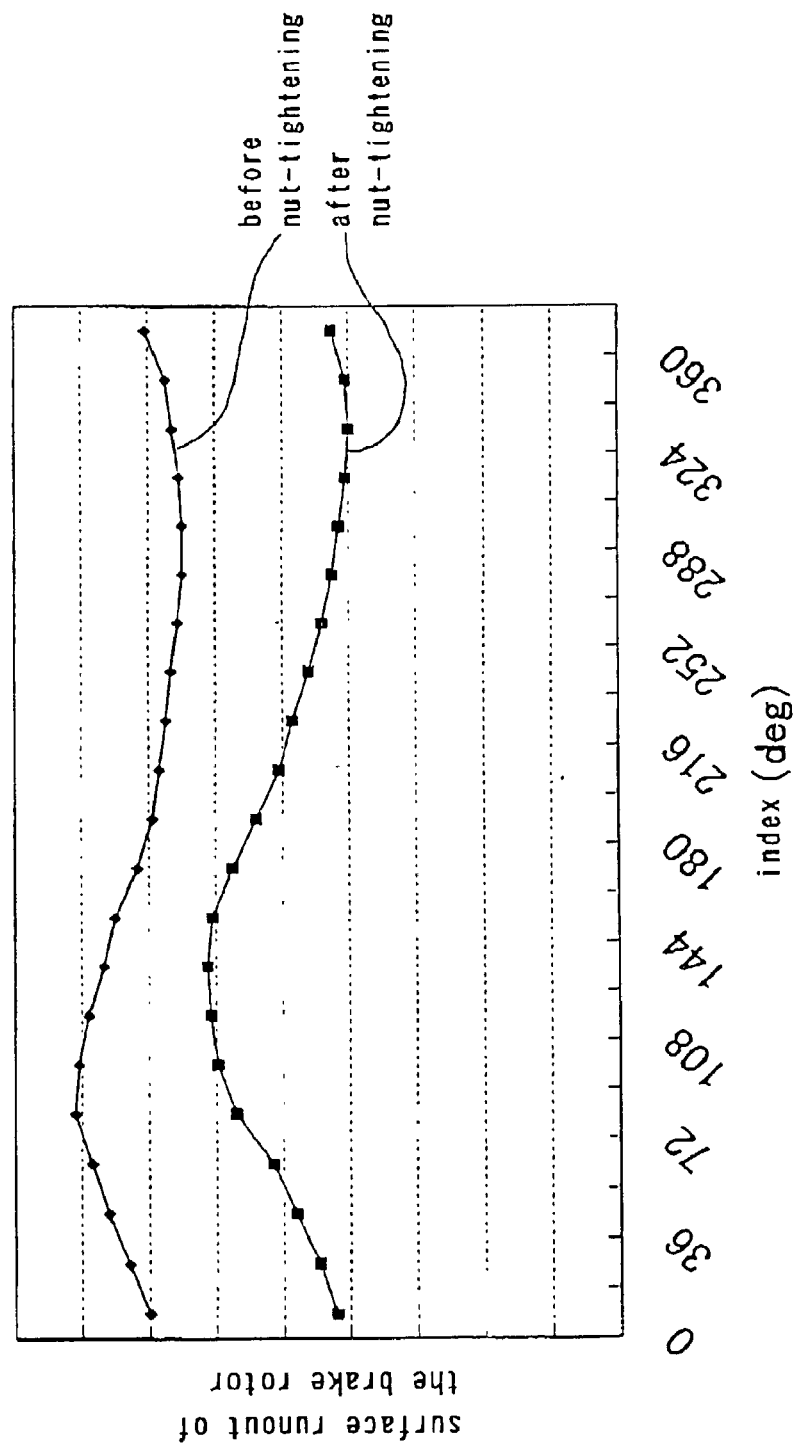
FIG. 10 is a graph showing the results of the measurement of surface runout as to the bearing device of the present invention.

As can be seen in FIG. 10, the degree of contact of the contacting portions 33a and 33b due to the tightening of nuts is improved and thus the surface runout is also improved when the width dimension is set so that the annular groove 7 is positioned between the contacting portions 33a and 33b of the wheel "W".

On the contrary, as can be seen in FIG. 11, the surface runout of the side 32 of the brake rotor 30 is worsened when the annular groove 7" is widened so that it reaches the contacting portions 33a and 33b.

If the depth of the annular groove is set at least larger than 0.3 mm, preferably 0.4 through 0.6 mm, it is possible to allow generation of the dispersion of machining of the annular groove and the dispersion of cutting of the flange after the studding of the hub bolts.

If the surface runout at the side 5a of the wheel mounting flange 5 on which the brake rotor 30 contacts is limited lesser 20 μm, it is possible to suppress the surface runout of the side 32 of the brake rotor 30 below 50 μm. When the surface runout of the side 32 exceeds 50 μm, the steering stability i.e. the brake judder is increased and thus a driver of vehicle will feel discomfort.

Although the present invention has been described with respect to so called third generation structure of the bearing apparatus i.e. the structure in which the inner wheel is press fitted to the hub wheel, the raceway surface of the outboard side is formed on the hub wheel and the raceway surface is formed on the inner wheel, the present invention can be also applied to the structure shown in FIGS. 12 through 15.

Also, although the present invention has been described with respect to the embodiment in which the side 5a of the wheel mounting flange 5 is initially cut before the press fit of the hub bolts 6 and secondly cut after the press fit thereof, the present invention is not limited only to such embodiment. For example, it is possible to carry out an initial cut of the side 5a comprising rough cutting and middle finish cutting before the press fit (studding) of the hub bolts 6 and then secondary cut (finish cut) after the press fit of the hub bolts 6. In addition, it is possible to omit the cutting before the press fit of the hub bolts (i.e. the surface as forged being remained) and to carry out only the secondary cutting (finish cutting) after the press fit of the hub bolts.

FIG. 12 shows a second embodiment of the bearing apparatus for a wheel of the present invention that is called as a bearing apparatus of first generation. The bearing apparatus comprises the hub wheel 100, the double row rolling bearing 200, and the constant velocity universal joint 300. The double row rolling bearing 200 is fitted on the step portion 101 of small diameter of the hub wheel 100 and held there as a unit by a shoulder 102 of the hub wheel 100 and a shoulder 302 of the outer joint member 301.

The torque of an engine is transmitted to the hub wheel 100 through the shaft portion 303 of the outer joint member 301 fitted on the hub wheel 100 via a serration. The double row rolling bearing 200 comprises an outer wheel 201 on the inner circumferential surface of which is formed with double row outer raceway surfaces, a pair of inner wheels 202 and 202 on the outer circumferential surface of which is formed with inner raceway surfaces, double row rolling elements (balls) 203 and 203 rotatably held between the outer wheel 201 and the inner wheels 202 and 202, and cages 204 and 204 for retaining the rolling elements 203 and 203 equidistantly along a circumferential direction. The outer wheel 201 is axially secured within a knuckle 400 by a stop ring 401. Seals 402 and 403 arranged at opposite ends of the knuckle 400 seal an annular space formed between the knuckle 400, the hub wheel 100 and the outer joint member 301. The hub wheel 100 and the outer joint member 301 are united by a nut 304 screwed on the thread formed on the shaft portion 303 of the outer joint member 301.

Figure 13:
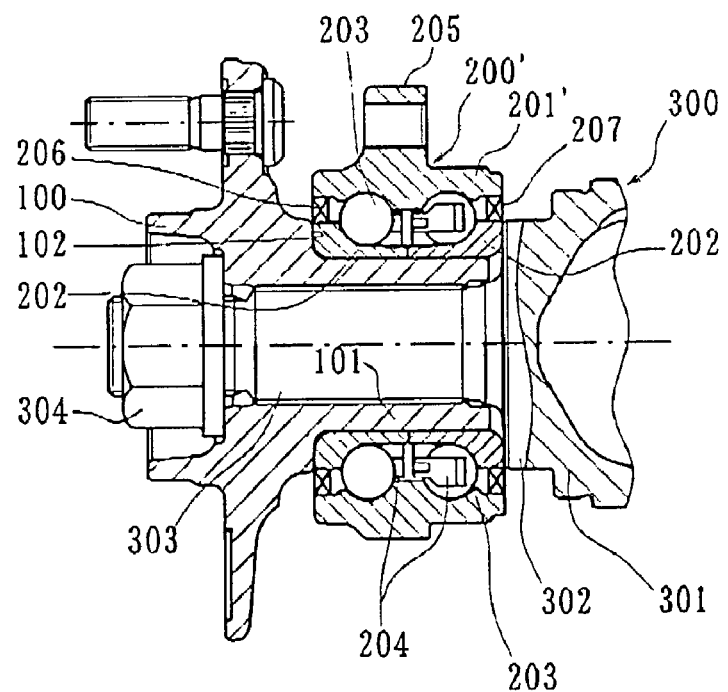
FIG. 13 is a longitudinal cross-section view of the bearing apparatus for a wheel of a third embodiment of the present invention.

FIG. 13 shows a third embodiment of the bearing apparatus for a wheel of the present invention that is called as a bearing apparatus of second generation. Only difference between the present embodiment and the first embodiment is in the double row rolling bearing 200', that is the flange 205 to be mounted on a vehicle body (not shown) is integrally formed with the outer wheel 201' and seals 206 and 207 are mounted on the outer wheel 201'.

Figure 14:
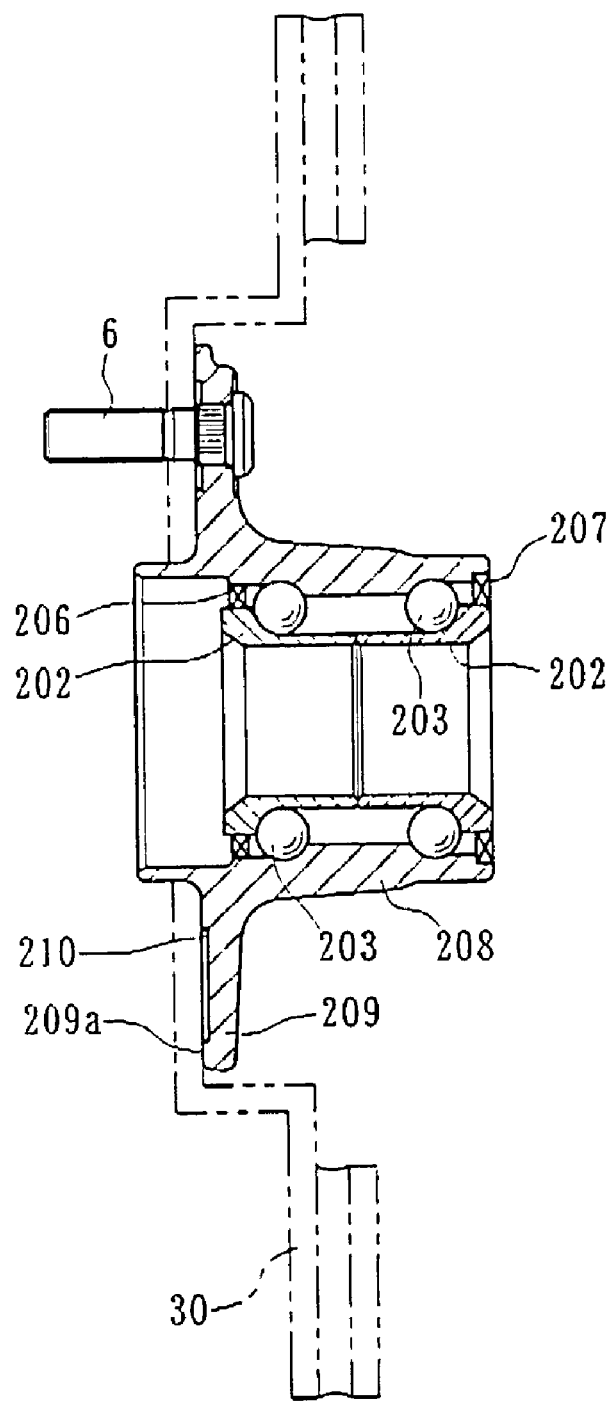
FIG. 14 is a longitudinal cross-section view of the bearing apparatus for a wheel of a fourth embodiment of the present invention.

FIG. 14 shows a fourth embodiment of the bearing apparatus for a wheel of the present invention that is called as a bearing apparatus of second generation similarly to the bearing apparatus shown in FIG. 13. Difference therebetween is in that the present invention is applied to the driven side. The present embodiment is an outer wheel rotary type in which the wheel mounting flange 209 is integrally formed with the outer wheel 208 therearound and the hub bolts 6 are studded equidistantly along a circumferential direction on the flange 209.

The side 209a of the wheel mounting flange 209 is initially cut e.g. by the lathe cutting to form the annular groove 210 and is then secondly cut. As previously stated, it is possible to form the side 209a by forging and to carry out the cutting after the press fit of the hub bolts 6.

Figure 15:
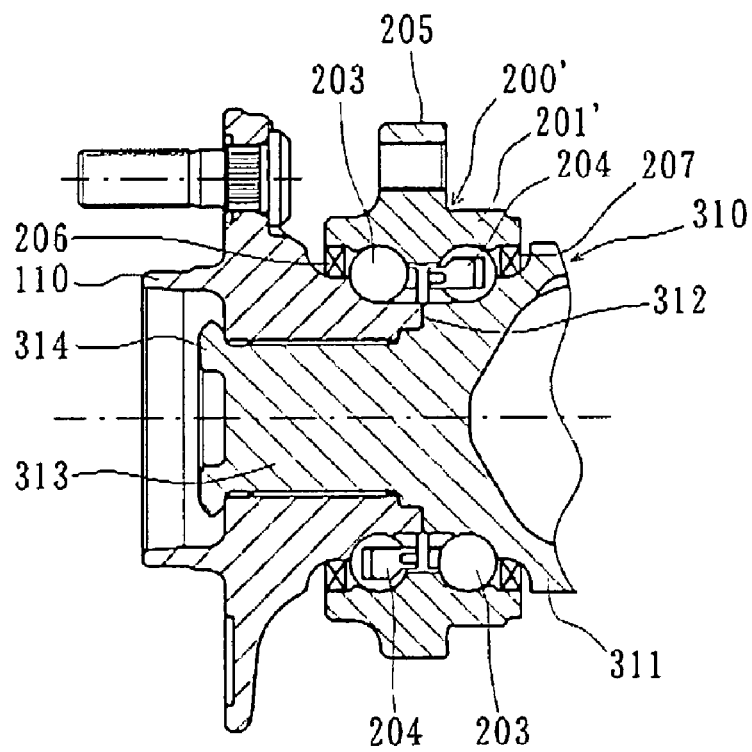
FIG. 15 is a longitudinal cross-section view of the bearing apparatus for a wheel of a fifth embodiment of the present invention.

FIG. 15 shows a fifth embodiment of the bearing apparatus for a wheel of the present invention that is called as a bearing apparatus of fourth generation. Differences of the present embodiment from that of the former embodiments is that the inner raceway surface of the outboard side is formed on the outer circumferential surface of the hub wheel 110 and that of the inboard side is formed on the shoulder 312 of the outer joint member 311 and that the shoulder 312 is abutted to the hub wheel 110 and the end 314 of the shaft portion 313 of the outer joint member 311 is caulked radially outwardly to integrate to the hub wheel 110.

In the first through third generations, the misalignment between the hub wheel and the interfit portion etc. is cumulatively added to the surface runout of the wheel mounting flange. In the fourth generation, although the influence caused by the misalignment of the interfit etc. is reduced, the wheel mounting flange of the hub wheel is deformed by the caulking between the hub wheel and the outer joint member and thus the surface runout of the side of the flange will be adversely influenced. In these cases, the secondary cutting of the side of the wheel mounting flange of the hub wheel after the assembly of the bearing apparatus can remarkably reduce the surface runout of the side of the flange.

The present invention is applicable to the first through fourth generations and is an effective means for improving the accuracy of the surface runout of the wheel mounting flange and suppressing the generation of the brake judder without losing the characteristic features of respective generations.

Figure 16:
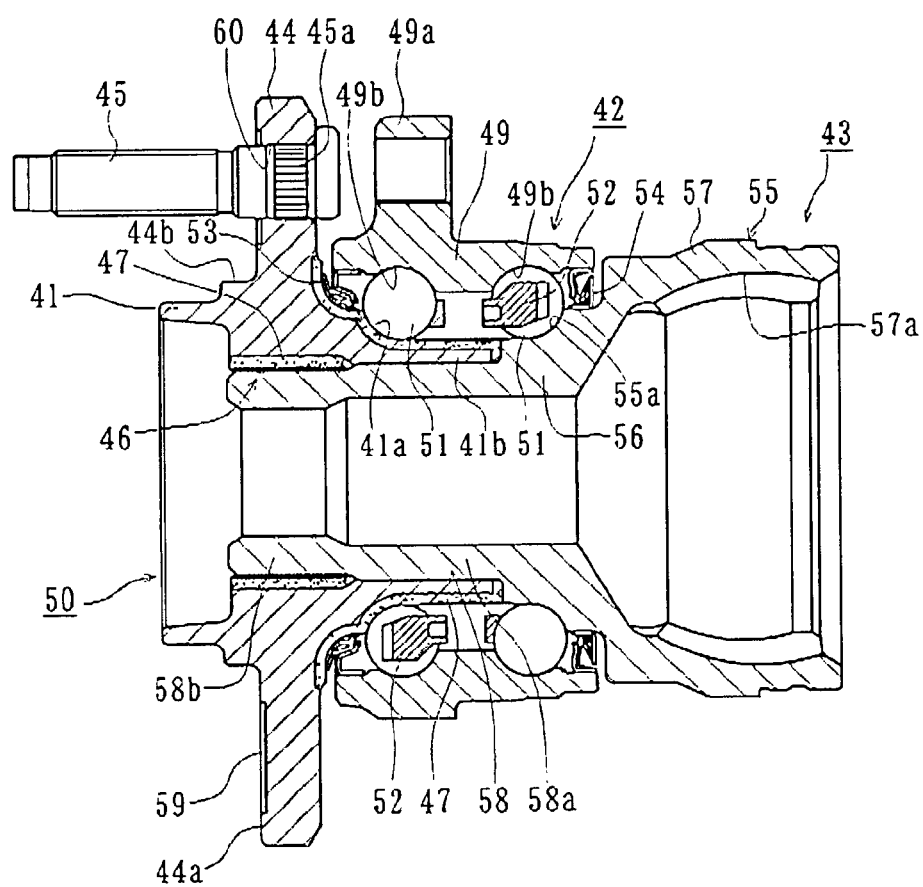
FIG. 16 is a longitudinal cross-section view of the bearing apparatus for a wheel of a sixth embodiment of the present invention.

FIG. 16 is a longitudinal cross-section view of a sixth embodiment of the bearing apparatus for a wheel of the present invention. The bearing apparatus comprises the hub wheel 41, the double row rolling bearing 42, and the constant velocity universal joint 43 that are formed as a unit.

Figure 17:
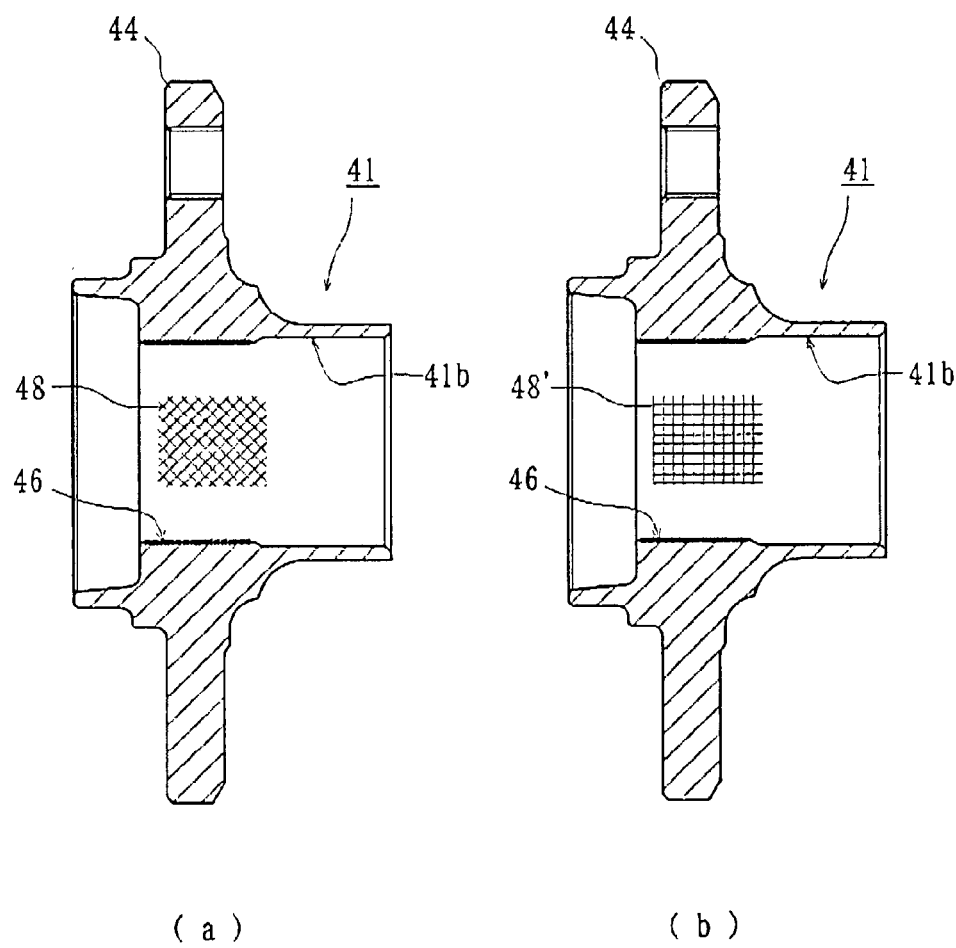
FIG. 17(a) is a longitudinal cross-section view of the hub wheel of the present invention showing an example of the crisscross knurl formed by mutually inclined spiral grooves.
FIG. 17(b) is a similar longitudinal cross-section view showing another example of crisscross knurl formed by axial grooves and mutually independent annular grooves.

The hub wheel 41 is integrally formed with the wheel mounting flange 44 for mounting a wheel (not shown) on its outboard side and a plurality of hub bolts 45 are press fitted (studded) in the bolt apertures 60 arranged equidistantly along a circumferential direction thereof. The inner circumferential surface of the hub wheel 41 is formed as an irregular surface portion 46 and has a layer 47 (shown by a dotted region) hardened by heat treatment to the surface hardness of HRC 54 through 64. The heat treatment is preferably the high frequency induction heating which can easily carry out the partial heating and set the hardening depth. The irregular surface portion 46 can be formed by orthogonally crossed grooves as shown in FIG. 17. FIG. 17(*a*) shows a crossed groove 48 formed by mutually inclined spiral grooves and FIG. 17(*b*) shows a crossed groove 48' of crisscross knurl formed by axial grooves and independent spiral grooves. Each projection of the irregular surface portion 46 may be formed as a pointed configuration to ensure good biting into the outer circumferential surface of the shaft portion 58.

The double row rolling bearing 42 comprises the outer wheel 49, the inner member 50, and the double row rolling elements 51 and 51. The outer member 49 is integrally formed with the flange 49*a* to be mounted on the vehicle body (not shown) on the outer periphery thereof and double row outer raceway surfaces 49*b* and 49*b* on the inner circumferential surface thereof. The inner member 50 comprises the hub wheel 41 and the outer joint member 55. The inner raceway surface 41*a* of the outboard side is formed on the outer periphery of the hub wheel 41 and inner raceway surface 55*a* of the inboard side is formed on the outer periphery of the outer joint member 55. Double row rolling elements 51 and 51 are rotatably held between the outer and inner raceway surfaces 49*b* and 41*a*; 49*b* and 55*a* by the cages 52 and 52. Seals 53 and 54 are arranged at opposite ends of the double rolling bearing 42 to prevent leakage of grease within the bearing as well as to prevent ingress of rainwater or dusts.

The hardened layer 47' (shown by a dotted region) is formed by the high frequency quenching in a seal land portion on which the seal lip of the seal 53 slides, and a faucet portion 41*b* abutting to the shoulder 56 of the outer joint member 55. Although the double row rolling bearing 42 is shown as a double row angular ball bearing, a double row tapered roller bearing may be used.

The constant velocity universal joint 43 comprises the outer joint member 55, a joint inner wheel, a cage, and torque transmitting balls (not shown). The outer joint member 55 comprises the cup-shaped mouth portion 57, the shoulder 56 forming the bottom of the mouth portion 57, and the shaft portion 58 axially extending from the shoulder 56. The inner circumferential surface of the mouth portion 57 is formed with axially extending curved track grooves 57*a*.

The inner raceway surface 55*a* is formed on the outer circumferential surface of the shoulder 56 of the outer joint member 55. The shaft portion 58 the stepped portion 58*a* to be press fitted to the faucet portion 41*b*, and the interfit portion 58*b* interfitted in the hub wheel 41. The interfit portion 58*b* is inserted into the hub wheel 41 until the faucet portion 41*b* abuts the shoulder 56. Then a suitable mandrel is inserted into the interfit portion 58*b* and then expands the interfit portion 58*b* radially outward to bite the outer circumferential surface of the interfit portion 58*b* into the irregular surface portion 46 of the hub wheel 41 and thus to integrate them each other via the plastic deformation of the interfit portion 58*b*. Since this connected portion i.e. the interfitted portion has both functions of torque transmission and of connection of the hub wheel 41 and the outer joint member 55, it is unnecessary to provide any torque transmission means such as a serration on the hub wheel 41 or the outer joint member 55 and any securing means such as fastening nuts, which enables to obtain a further reduced and compacted bearing apparatus.

The surface of a region of the outer joint member 55 from the track groove 57*a* and the seal land portion on which the seal 54 slides to the inner raceway runout 55*a* and the stepped portion 58*a* of a small diameter is hardening treated. The hardening treatment is preferably a high frequency induction quenching. It is also preferable that the interfit portion 58*b* is quenched to the surface hardness less than HRC 24 and the irregular surface portion 46 of the hub wheel 41 is quenched to the surface hardness of HRC 54 through 64 so as to provide a hardness difference between them more tan HRC 30. This enables the irregular surface portion 46 of the hub wheel 41 to easily and deeply bite into the interfit portion 58 and thus to strongly unite them via the plastic deformation.

Although not being shown, it is possible to provide an end cap on the inner end of the hollow outer joint member 55 to prevent the leakage of grease contained therein and also to prevent the ingress of rainwater or dusts thereto.

In this embodiment, the side 44*a* of the wheel mounting flange 44 is initially cut by a lathe and the like to form the annular groove 59. The bolt apertures 60 are formed in the annular groove 59 equidistantly therealong. Then the side 44*a* and the pilot portion 44*b* are secondly cut as a finish cut after the hub bolts 45 each having a knurl 45*a* have been press fitted in the bolt apertures 60. The secondary cut may be carried out by using a milling machine or a grinding machine. It is no necessary to form the bolt apertures 60 at the center of width of the annular groove 59. The press fit of the hub bolts 45 to the wheel mounting flange 44 can be carried out either before or after the interfit of the hub wheel 41 and the outer joint member 55. However the secondary cut of the side 44*a* of the wheel mounting flange 44 have to be carried out after the bearing apparatus has been finally assembled.

Similarly to the first embodiment (FIG. 1), although it is also possible in the present embodiment to improve the operability of the secondary cut of the side 44*a* after the press fit of the hub bolts 45 if the width dimension of the annular groove 59 is set large, this reduces the contact area between the side 44*a* and the brake rotor and thus causes a large deformation of the wheel mounting flange 44 due to fastening of nuts (not shown). It has been found that when the distance between the outer circumferential surface of each hub bolt 45 and the edge of the annular groove 59 is 1 mm, the contact area between the side 44*a* and the brake rotor is not so much reduced and thus it is possible to suppress the deformation of the side 44*a* and therefore the surface runout thereof when the wheel is tightened by nuts. If said distance is more than 1 mm, the cutting tool such as a cutting bite will not interfere with the hub bolts and thus the operability will not be detracted.

The provision of the annular groove 59 on the side 44*a* can suppress the influence of the studding of the hub bolts 45 to the side 44*a* minimum. In addition, the secondary cutting of the side 44*a* after the press fitting (studding) of the hub bolts 45 can reduce the surface runout of the side 44*a* generated by the inter fit of the hub bolts 45 to almost zero.

Although when the annular groove 59 is not formed on the side 44*a*, it is possible to reduce the surface runout to almost zero by carrying out the secondary cutting of the side 44*a* and also to correct the pilot portion 44*b* deformed by the interfit operation.

Figure 18:
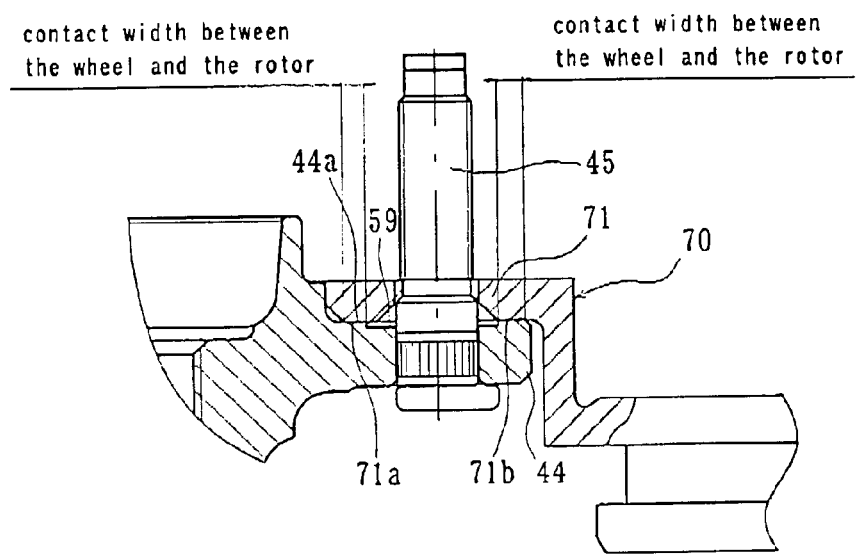
FIG. 18 is an enlarged cross-section view showing an essential portion of the bearing apparatus for a wheel of the present invention.

FIG. 18 is an enlarged cross-section view showing a condition in which the brake rotor 70 is mounted on the wheel mounting flange 44 of the hub wheel 41. It is found that provision of contact surfaces 71*a* and 71*b* between the mounting portions 71 of the rotor 70 and flange 44 at either sides of the hub bolts 45 can suppress the deformation of the flange 44 due to the fastening of the nuts minimum.

Figure 19:
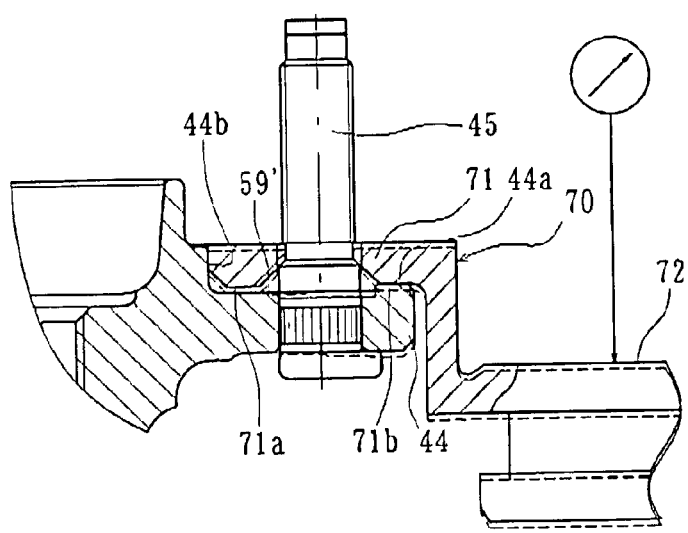
FIG. 19 is an explanatory view showing a portion corresponding to the portion of FIG. 18 for comparing therewith.

FIG. 19 is an enlarged cross-section view showing a condition in which the brake rotor 70 is mounted on the wheel mounting flange 44 and there is shown an annular groove 59' extended to a pilot portion 44*b*. In this case, the mounting portion 71 of the brake rotor 70 can contact with the flange 44 only at the region 71*b* and not contact with the flange at region 71*a* inside the hub bolts 45. Under the circumstances, the surface runout of a side 72 of the brake rotor 70 after the tightening of the hub bolts 45 is increased due to the inclination of the flange 44.

It is also found that the surface runout of the brake rotor 70 can be suppressed by inclining or projecting the region of the wheel mounting flange radially outward of the bolt apertures toward the wheel side. This is because that the mounting portion 71 of the brake rotor 70 can intimately contacts with the side 44a of the wheel mounting flange 44 at a radially outward region and thus the freedom of the deformation is restrained. It is preferable that the amount of the projection should be less than 0.1 mm (at most inclination angle 10'). If the projection exceeds this value, the wheel mounting flange 44 itself would be inclined and the surface runout of the side 72 of brake rotor 70 would be worsened.

The present invention has described in relation to the embodiment applied to the bearing apparatus of so called the fourth embodiment in which the hub wheel, the double row rolling bearing, and the constant velocity universal joint are united, and the inner raceway surface of the outboard side is formed on the outer circumferential surface of the hub wheel and inner raceway surface of inboard side is formed on the outer circumferential surface of the outer joint member of the constant velocity universal joint. However, the present invention can be applied not only to the bearing apparatus of the fourth generation but also to the bearing apparatus of the third generation in which the separate inner wheel is press fitted in the hub wheel, the outboard side raceway surface is formed on the hub wheel, and the inboard side raceway surface is formed on the separate inner wheel, as well as to the bearing apparatus of the first and second generations.

Also, although the present invention has been described with respect to the embodiment in which the side 44a of the wheel mounting flange 44 is initially cut before the press fit of the hub bolts 45 and secondly cut after the press fit thereof, the present invention is not limited only to such embodiment. For example, it is possible to carry out an initial cut of the side 44a comprising rough cutting and middle finish cutting before the press fit (studding) of the hub bolts 45 and then secondary cut (finish cut) after the press fit of the hub bolts 45. In addition, it is possible to omit the cutting before the press fit of the hub bolts (i.e. the surface as forged being remained) and to carry out only the secondary cutting (finish cutting) after the press fit of the hub bolts.

The present invention is applicable to the first through fourth generations and is an effective means for improving the accuracy of the surface runout of the wheel mounting flange and suppressing the generation of the brake judder without losing the characteristic features of respective generations.

Figure 20:
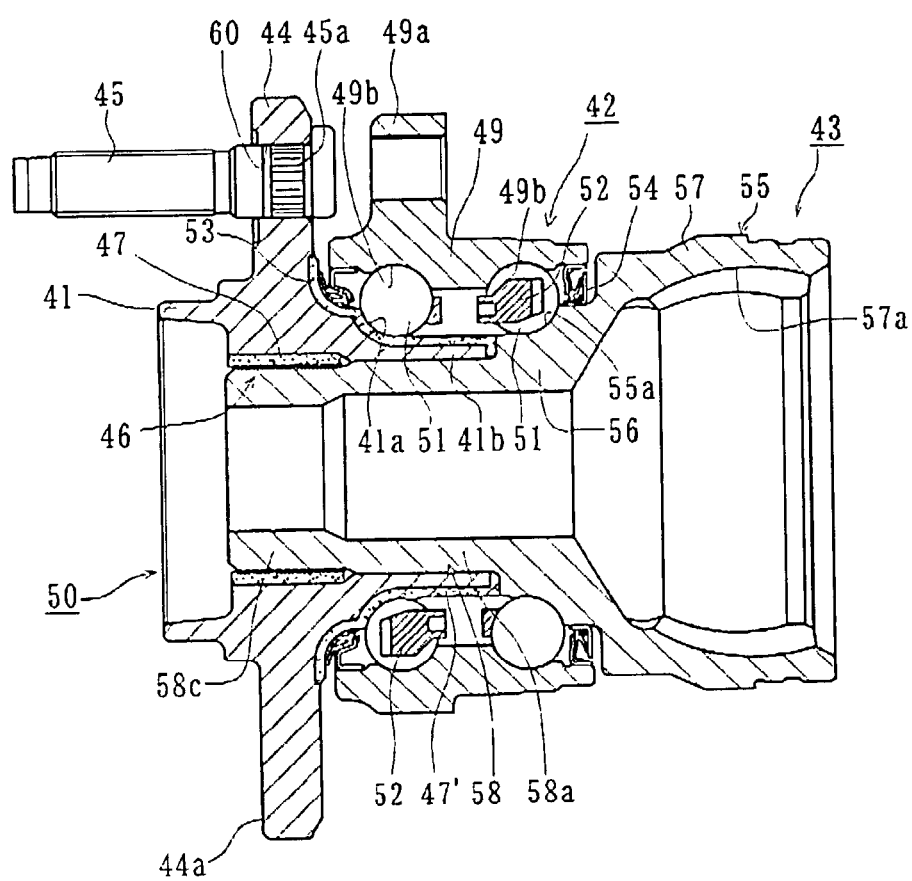
FIG. 20 is a longitudinal cross-section view of the bearing apparatus for a wheel of a seventh embodiment of the present invention.
Figure 21:
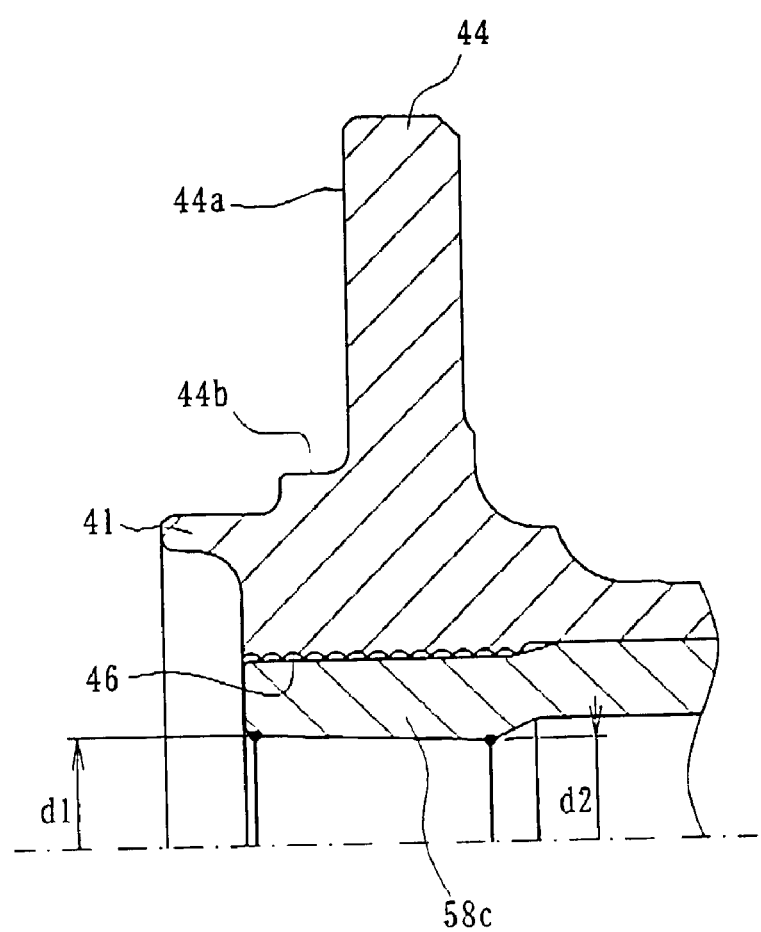
FIG. 21 is a longitudinal cross-section view of an essential portion of FIG. 20.

FIG. 20 is a longitudinal cross-section view of a seventh embodiment of the bearing apparatus for a wheel of the present invention. The present embodiment is a modified embodiment of the sixth embodiment (FIG. 16) and a structure of connection between the hub wheel and the outer joint member via plastic deformation is different from that in the sixth embodiment.

The interfit portion 58c of the shaft portion 58 of the outer joint member 55 is tapered so that the inner diameter of the interfit portion of the outer joint member gradually decreases from the outboard side to the inboard side. That is, it is determined that the inner diameter "d1" of the outboard side is larger than the inner diameter "d2" of the inboard side (d1>d2) so that the amount of expansion of the interfit portion 58c of the outboard side is smaller than that of the inboard side. This structure can suppress the amount of expansion of the pilot portion 44b due to the connection via the plastic deformation and also suppress the surface runout of the side 44a of the wheel mounting flange 44. The configuration of the inner circumferential surface is not limited to a taper and a crown configuration comprising e.g. a smooth curve may be adopted.

According to a test carried out by the applicant of the present invention, it is verified that when the mandrel is pressed into the interfit portion 58c with a force of 14 through 15 ton, the outer diameter of the pilot portion 44b was expanded about 50 μm and the outermost portion of the wheel mounting flange 44 was inclined about 20 μm toward the inboard side in a conventional case of d1=d2 and on the contrary, the structure of the interfit portion 58c can reduce the amounts of the respective deformation to less than ⅓.

Figure 22:
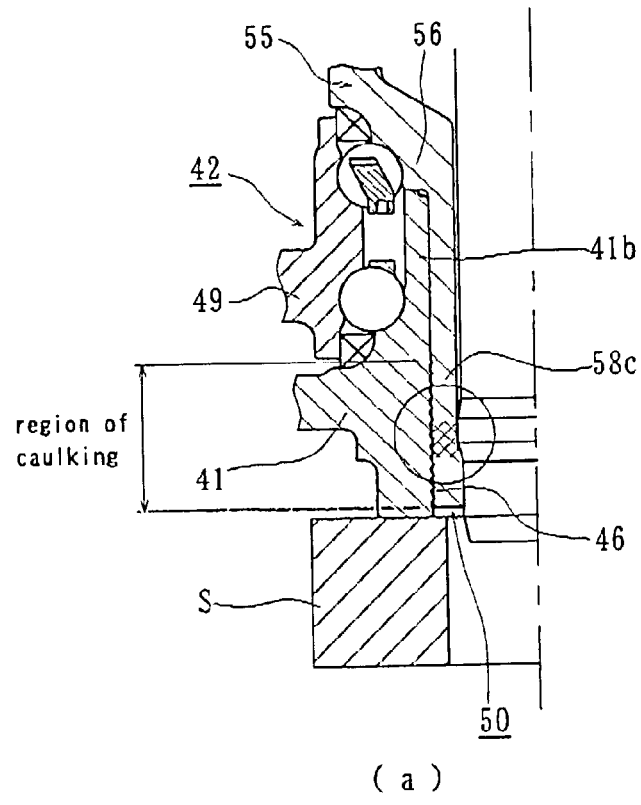
FIG. 22(a) is an explanatory view showing a method for connecting two parts via plastic deformation therebetween of the bearing apparatus of the present invention.
FIG. 22(b) is an enlarged cross-section view of an essential portion of FIG. 22(a)
Figure 22:
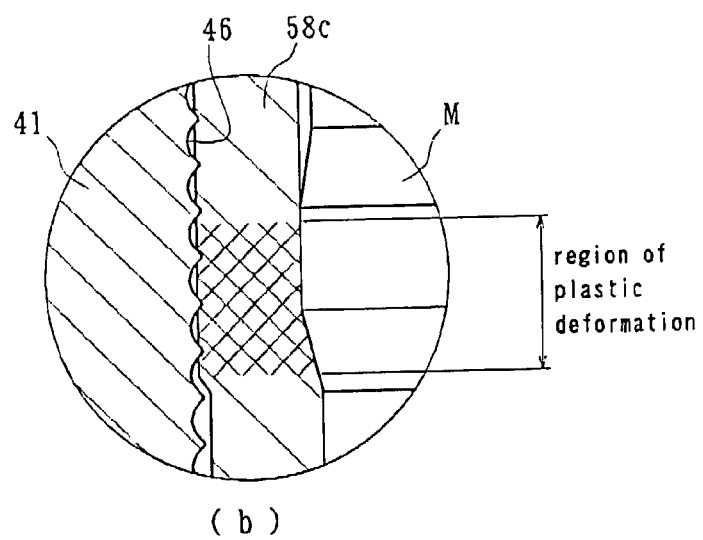

As shown in FIG. 22(a) and FIG. 22(b), when a mandrel "M" is pressed into the inner member 50 placed on a base "S" from the inboard side to the outboard side, the faucet portion 41b of the hub wheel 41 will be compressed between the shoulder 56 and the base "S" and thus the compression stress is remained after the connection via the plastic deformation due to the expansion of the interfit portion 58c (cross-hatched portion). In such connection via the plastic deformation, no gap is caused at the abutted portion between the faucet portion 41b and the shoulder 56 and thus the inside gap of the double row rolling bearing 42 can maintain the predetermined negative gap.

Figure 23:
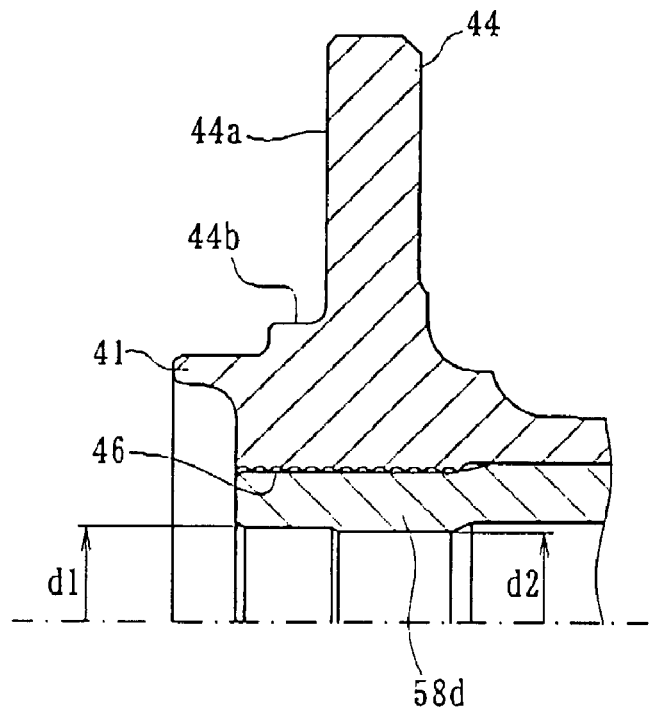
FIG. 23 is a longitudinal cross-section view of the bearing apparatus for a wheel of an eighth embodiment of the present invention.

FIG. 23 is an enlarged longitudinal cross-section view of a eighth embodiment of the bearing apparatus for a wheel of the present invention. The present embodiment is different from the seventh embodiment only in a structure of the interfit portion of the outer joint member.

In the interfit portion 58d, the inner diameter d1 of the outboard side is formed larger than the inner diameter d2 of the inboard side so that the amount of the expansion of the outboard side is small relative to that of the inboard side. Similarly to the seventh embodiment, this structure can suppress the expansion of the pilot portion 44b and the inclination of the wheel mounting flange 44 due to the elongation of the interfit portion 58d to the outboard side. In addition, such stepped configuration makes easy the dimension control i.e. the control of the amount of the expansion.

Figure 24:
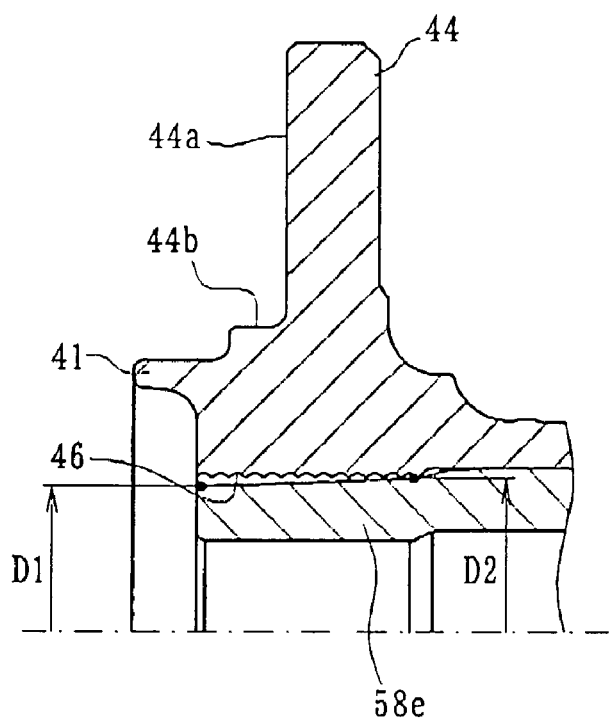
FIG. 24 is a longitudinal cross-section view of the bearing apparatus for a wheel of a ninth embodiment of the present invention.

FIG. 24 is an enlarged longitudinal cross-section view of a ninth embodiment of the bearing apparatus for a wheel of the present invention. Similarly to the eighth embodiment, the present embodiment is different from the seventh embodiment only in a structure of the interfit portion of the outer joint member.

The outer diameter of the interfit portion 58e is tapered so that it gradually increases from the outboard side to the inboard side. That is, it is determined that the outer diameter "D1" of the outboard side is smaller than the outer diameter "D2" of the inboard side (D1<D2) so that the amount of expansion of the interfit portion 58e of the outboard side is smaller than that of the inboard side.

Figure 25:
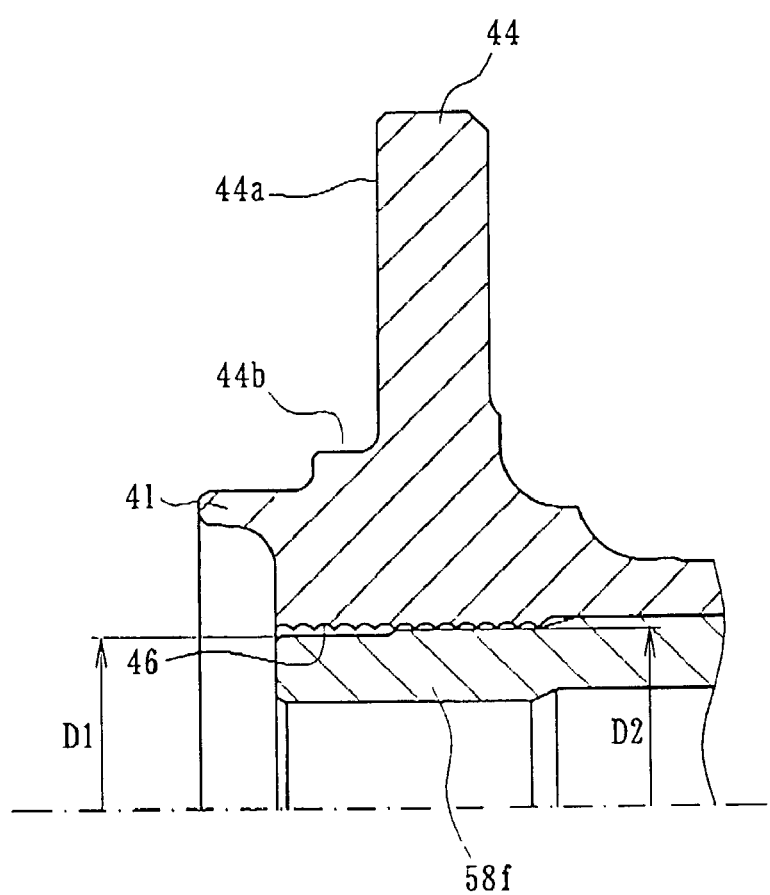
FIG. 25 is a longitudinal cross-section view of the bearing apparatus for a wheel of a tenth embodiment of the present invention.

In a tenth embodiment shown in FIG. 25, the outer diameter D1 of the outboard side of the interfit portion 58f is formed smaller than the outer diameter D2 of the inboard side so that the amount of the expansion of the outboard side is small relative to that of the inboard side. Similarly to the previous embodiments, this structure can suppress the amount of expansion of the pilot portion 44b and also suppress the inclination of the wheel mounting flange 44 due to the elongation of the interfit portion 58f toward the outboard side.

Figure 26:
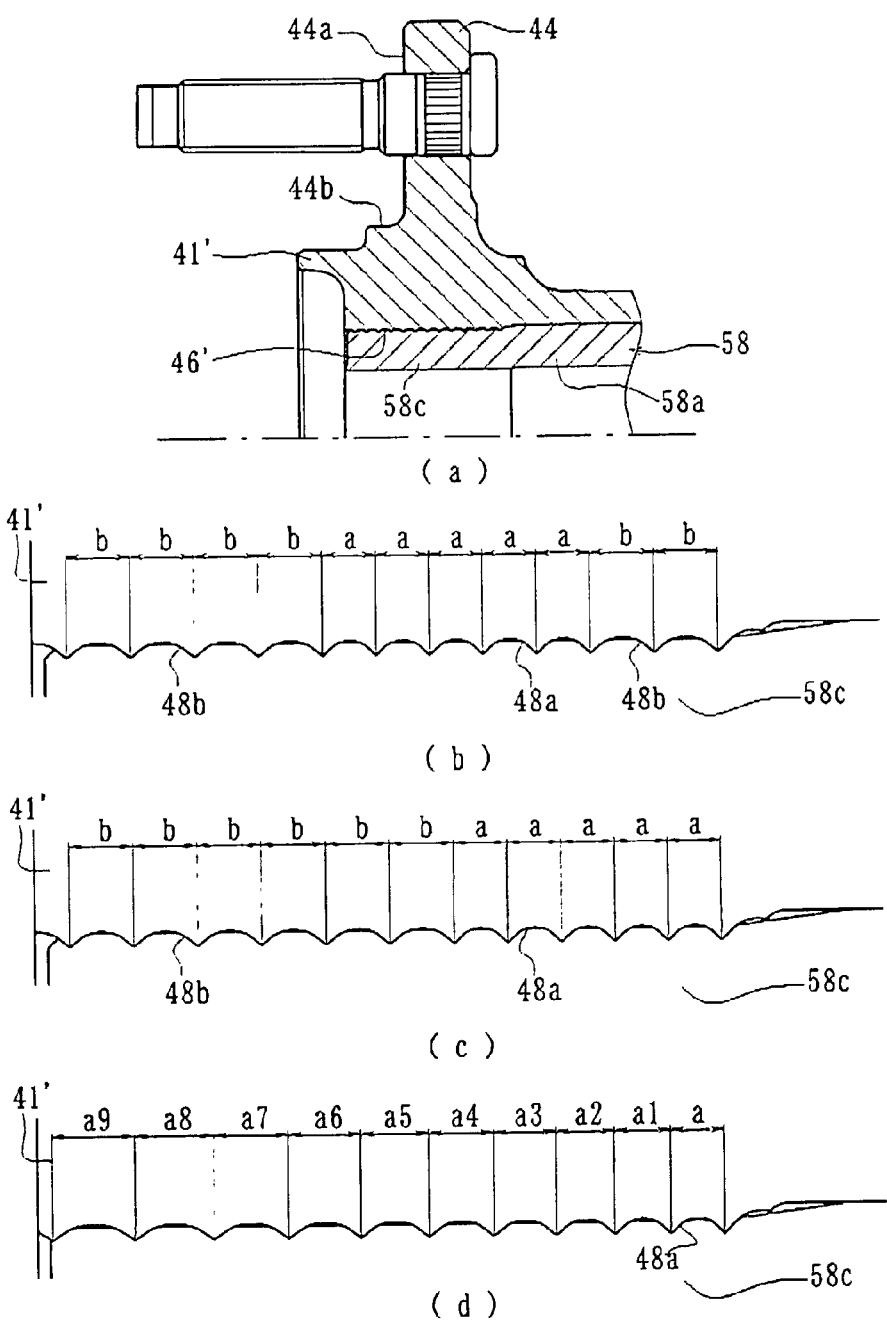
FIG. 26(a) is a longitudinal cross-section view of the bearing apparatus for a wheel of an eleventh embodiment of the present invention.
FIGS. 26(b) through (d) are enlarged cross-section views of essential portions of other embodiments.

FIG. 26 is an enlarged longitudinal cross-section view of an eleventh embodiment of the bearing apparatus for a wheel of the present invention. The present embodiment is different from the seventh embodiment only in a structure of the irregular surface portion.

The inner circumferential surface of the hub wheel 41' is formed with an irregular surface portion 46'. The irregular surface portion 46' is formed by crossed grooves 48' (see FIG. 17) by a plurality of independent annular grooves and axial grooves and has a crisscross knurl. FIGS. 26(b) through 26(d) are enlarged views showing the annular grooves formed by lathe cutting. These groove structures are different from the previous ones in that each groove has a width different from that of other groove in the axial direction. FIG. 26(b) shows that each of the annular grooves 48a corresponding to the width of the wheel mounting flange 44 has a groove width "a" and each of the other annular grooves 48b has a groove width "b" larger than the groove width "a". Such structure makes it possible to change the amount of bite of the irregular surface portion 46' of the interfit portion 58c and thus to suppress minimum the expansion of the pilot portion 44b and the surface runout of the side 44a of the wheel mounting flange 44. In addition, it is possible to increase the torque transmitting ability at the connected portion via the plastic deformation by increasing the density of the annular groove in a range corresponding to the width of the wheel mounting flange 44, i.e. by increasing the number of the groove per a unit length.

FIG. 26(c) shows another embodiment in case that the wheel mounting flange 44 is arranged at a position displaced to the outboard side in which, similarly to the embodiment of FIG. 26(b), the each of the annular grooves 48a corresponding to the width of the wheel mounting flange 44 has a groove width "a" and each of the other annular grooves 48b has a groove width "b" larger than the groove width "a". In this case, it is possible to gradually increase the groove width of the annular groove 48a toward the outboard side such as "a", "a1", "a2", "a3", "an" as shown in FIG. 26(d). Furthermore, it is possible to change the depth of the annular grooves in stead of the groove width to adjust the amount of expansion of the pilot portion.

Figure 27:
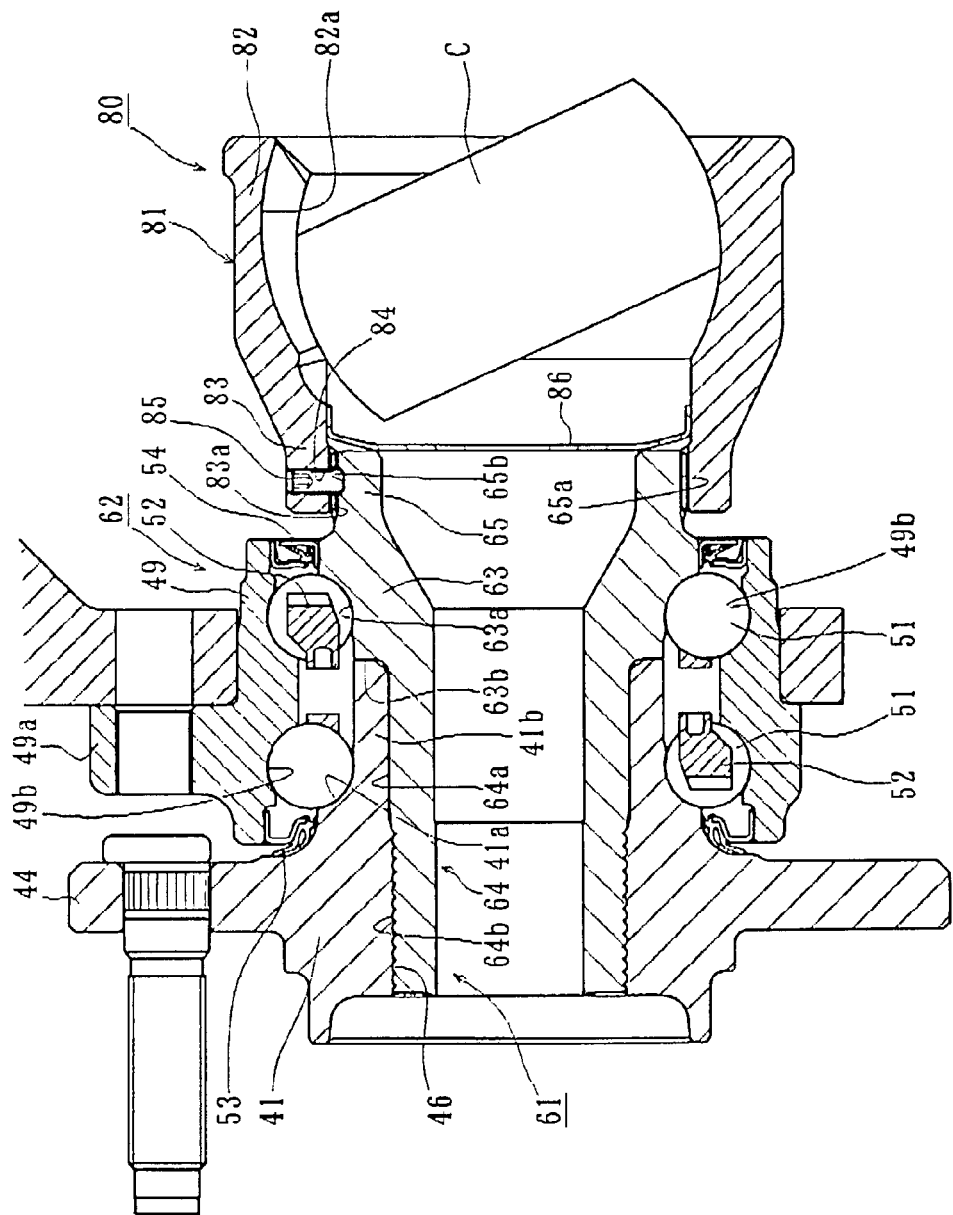
FIG. 27 is a longitudinal cross-section view of the bearing apparatus for a wheel of a twelfth tenth embodiment of the present invention.
Figure 28:
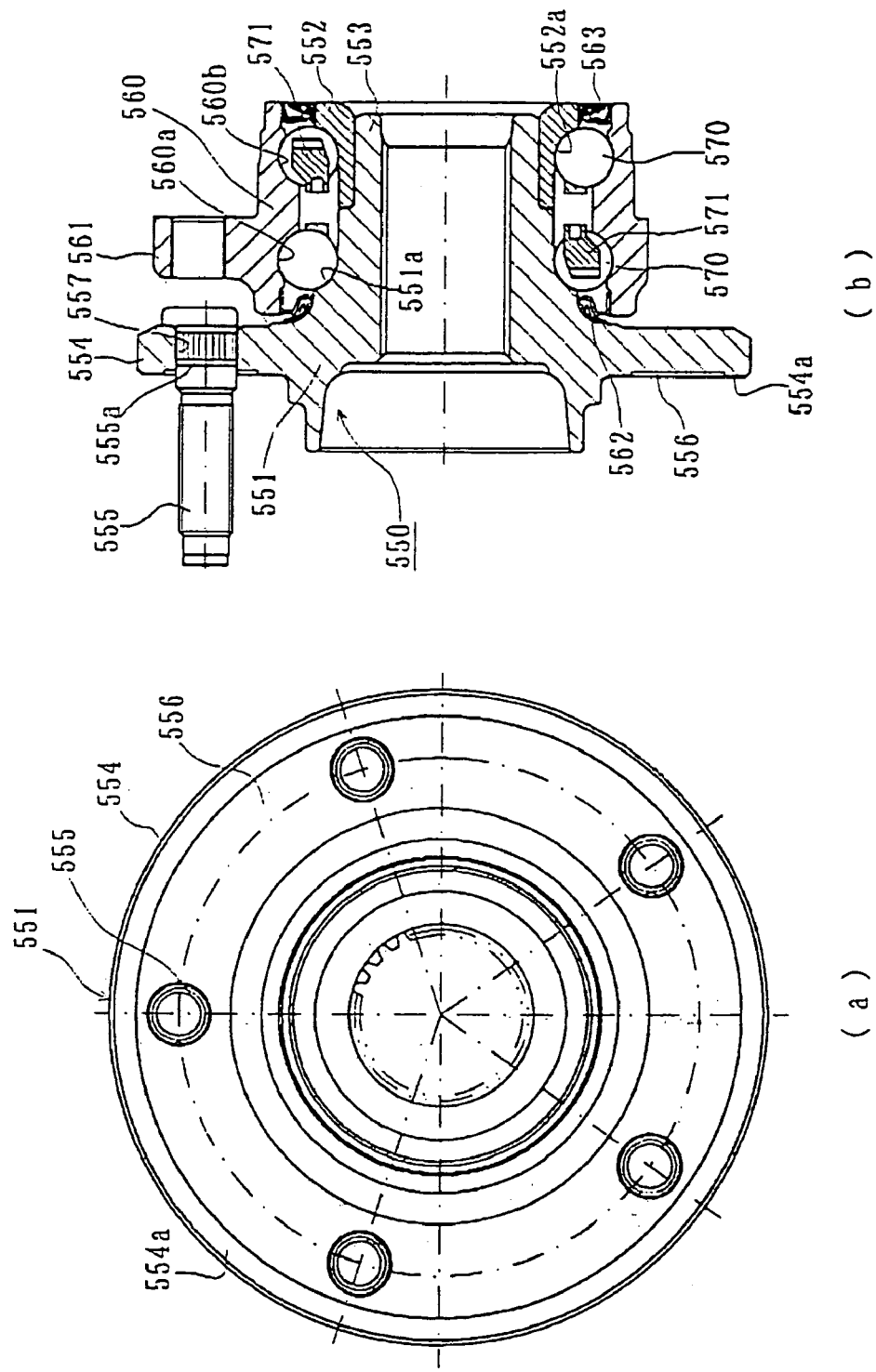
FIG. 28(a) is a side elevational view of a bearing apparatus for a wheel of the prior art.
FIG. 28(b) is a longitudinal cross-section view thereof.

FIG. 27 is an enlarged longitudinal cross-section view of a twelfth embodiment of the bearing apparatus for a wheel of the present invention. In this bearing apparatus, the inner member 61 and the double row rolling bearing 62 are formed as a sub-unit and this sub-unit is connected to the constant velocity universal joint 80 to form a unit of bearing apparatus.

The inner member 61 comprises the hub wheel 41 and the inner wheel 63. The inner wheel 63 has a cylindrical configuration and also has at its outer circumferential surface an inner raceway surface 63a of inboard side and the stepped portion 64 of a small diameter. The stepped portion 64 has the faucet portion 64a inserted in the hub wheel 41, the interfit portion 64b, and a connecting portion 65. The outer circumferential surface of the connecting portion 65 is formed with a male spline (or a serration) 65a and 1 through 3 recesses 65b are formed at the center in the axial direction of the male spline 65a. Each of these recesses 65b is formed as a circle shape or an oblong shape extending in a circumferential direction. The inner wheel 63 and a hub wheel 41 are made of medium carbon steel. Each of the inner raceway surface 63a, the stepped portion 64 of a small diameter, and the male spline 65a is formed with a hardened layer heat treated to have the surface hardness HRC 58 through 64. The heat treatment is preferably the high frequency induction quenching which can carry out a partial heating and relatively easily set the depth of the hardened layer. However, the interfit portion of the stepped portion 64 should be kept as a raw material without any heat treatment.

The stepped portion 64 of a small diameter is inserted in the hub wheel 41 until the end of the faucet portion 41b abuts to the shoulder 63b of the inner wheel 63 to engage the interfit portion 64b with the irregular surface portion 46. Then the mandrel (not shown) is inserted in the interfit portion 64b to expand the interfit portion 54b so that the irregular surface portion 48 bites into the interfit portion 64b to integrally connect the hub wheel 41 and the inner wheel 63. In this case, by providing difference of the hardness more than HRC 30 between the irregular surface portion 46 and the interfit portion 64b, the irregular surface portion 46 and the interfit portion 64b can be strongly connected via the plastic deformation due to the bite of the portion 46 to the interfit portion 64b without causing collapse of irregular tips of the portion 46.

Since large interfit area can be ensured between the inner wheel 63 and the hub wheel 64 by extending the stepped portion 64 from the inner wheel 63, sufficiently large rigidity can be ensured to bear the repeatedly acting bending moment caused every time in turning of the vehicle. Accordingly, it is possible to improve both the stability in steering and the durability. Although it is shown as one example that the inner wheel 63 and the connecting portion 65 are integrally formed, it is possible to interfit a separate inner wheel made for example of SUJ 2 to an annular member integrally formed with the connecting portion.

The constant velocity universal joint comprises the outer joint member 81, cage "C", a joint inner wheel (not shown), and torque transmitting balls. The outer joint member 81 is hollow and comprises the cup-shaped mouth portion 82, and a shoulder 83 formed smaller diameter than the mouth portion 82. Axially extending curved track grooves 82a are formed on the inner surface of the mouth portion 82. The inner circumferential surface of the shoulder 83 is formed with a female spline (or a serration) 83a and the shoulder 83 is formed with several apertures 84 passing therethrough substantially at the center of the female spline 83a in its axial direction.

The outer joint member 81 is made of mediate carbon steel such as S53C and the surfaces of the track grooves 82a and female spline 83a formed on the inner circumferential surface of the mouth portion 82 hardened to the surface hardness of HRC 58 through 64 preferably by the high frequency induction heating. On the other hand, the outer joint member 81 may be made of case hardened steel such as SCr415 and a whole surface thereof can be formed with a hardened layer.

The axial positioning between the inner wheel 63 and the outer joint member 81 can be carried out by engaging the tips of set screws 85 screwed in the apertures 84 formed in the shoulder 83 with the recesses 65b formed in the male spline 65a of the connecting portion 65. The number of the set screw 85 is appropriately selected within 1 through 3 in accordance with a desired separating force with respect to the inner wheel 63 and the outer joint member 81. A numeral 86 denotes an end cap of steel fitted in the inner circumferential surface of the shoulder 83 for preventing leakage of grease within the bearing as well as to prevent ingress of rainwater or dusts.

The structure comprising the set screws 85 engaging with the recesses 65b for securing the axial position between the inner wheel 63 and the outer joint member 81 can eliminate provision of annular groove formed for mounting a set ring of the prior art. Thus it is possible to prevent the reduction of the effective length of the spline and also to make the bearing apparatus compact and improve the assembling efficiency. In addition, the mounted condition of the set screws 85 as connecting members can be visually inspected and thus it is possible to improve the reliability of the quality of articles. Although set screws are shown for an example as connecting members, it is possible to use other suitable means such as split pins passed radially through the shoulder.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A bearing apparatus for a wheel comprising a rolling bearing for rotatably supporting a wheel relative to a body of a vehicle having double row rolling elements arranged between an inner member and an outer member; a wheel mounting flange formed on either the inner member or the outer member for fastening thereon the wheel via a brake rotor; characterized in that one side of the wheel mounting flange is cut to form an annular groove, and is initially cut into the side of the wheel mounting flange, hub bolts are press fit into said plurality of apertures formed in said groove providing a plurality of hub bolts studded on the wheel mounting flange circumferentially along the periphery, and secondarily cut-finishing a surface initially cut after the press fit of the bolts; and at least a region of the wheel mounting flange positioned radially outward of the bolt apertures, toward the wheel side, is cut during said secondary cut finishing, said cut finishing inclining said at least region and said at least region defining a peripheral portion that is in intimate contact radially outwardly across the entire at least region with the brake rotor for reducing runout and said at least region of the wheel mounting flange positioned radially outward of the hub bolts is inclined and projects more toward the wheel side than an inner region of the wheel mounting flange positioned radially inward of the bolt apertures so that said at least region of the wheel mounting flange positioned radially outward of the hub bolts projects from the mounting flange so that said radially inner region of the wheel mounting flange and said at least region of the wheel mounting flange positioned radially outward of the hub bolts are not co-planar.

2. A bearing apparatus for a wheel of claim 1 wherein the dimension of the width of the annular groove, when the wheel is made of steel, is so determined that the outer diameter of the annular groove is smaller than the diameter of the contacting portion between the wheel and the brake rotor positioned radially outward of the pitch circle diameter of the hub bolts as well as the inner diameter of the annular groove is larger than the diameter of the contacting portion between the wheel and the brake rotor positioned radially inward of the pitch circle diameter of the hub bolts.

3. A bearing apparatus for a wheel of claim 1 wherein the surface runout at a side of the wheel mounting flange on which the brake rotor contacts is smaller than 20 μm.

4. A bearing apparatus for a wheel of claim 1 wherein the wheel mounting flange is formed with an annular groove having a predetermined width including apertures for the hub bolts, and wherein one side of the wheel mounting flange except for the region of the annular groove is formed as a cut-finished surface cut after the press fit of the hub bolts.

5. A bearing apparatus for a wheel of claim 4 wherein the hub bolts are studded within the annular groove and wherein the distance between the external surface of each hub bolt and the edges of the annular groove is set larger than 1 mm.

6. A bearing apparatus for a wheel of claim 4 wherein the depth of the annular groove is set at least larger than 0.3 mm.

\* \* \* \* \*

UNITED STATES PATENT AND TRADEMARK OFFICE
CERTIFICATE OF CORRECTION

PATENT NO. : 7,832,939 B2
APPLICATION NO. : 10/234969
DATED : November 16, 2010
INVENTOR(S) : Mitsuru Umekida et al.

Page 1 of 1

It is certified that error appears in the above-identified patent and that said Letters Patent is hereby corrected as shown below:

IN THE DRAWINGS:
Figure 29, should be deleted to appear as the illustrated figure 29 shown below:

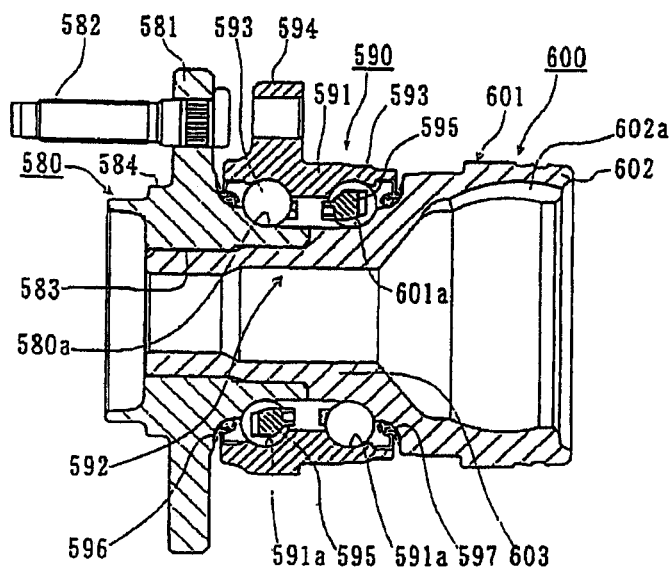

Fig. 29

Prior Art

Signed and Sealed this
Twelfth Day of June, 2012

David J. Kappos
*Director of the United States Patent and Trademark Office*